United States Patent
Rose et al.

(10) Patent No.: US 10,718,359 B2
(45) Date of Patent: Jul. 21, 2020

(54) DEVICES AND SYSTEMS FOR PRODUCING ROTATIONAL ACTUATION

(71) Applicant: Quality Manufacturing Inc., Winchester, KY (US)

(72) Inventors: Jeffrey A. Rose, Lexington, KY (US); Raymond Cooper, Irvine, KY (US); Kevin Richardson, Louisville, KY (US); Stephen Rose, Lexington, KY (US); Jeffrey John Sweda, Lexington, KY (US)

(73) Assignee: QUALITY MANUFACTURING INC., Winchester, KY (US)

( * ) Notice: Subject to any disclaimer, the term of this patent is extended or adjusted under 35 U.S.C. 154(b) by 360 days.

(21) Appl. No.: 15/235,923

(22) Filed: Aug. 12, 2016

(65) Prior Publication Data

US 2017/0051764 A1    Feb. 23, 2017

Related U.S. Application Data

(60) Provisional application No. 62/208,250, filed on Aug. 21, 2015.

(51) Int. Cl.
*F15B 15/12*    (2006.01)
*B25J 9/14*    (2006.01)
(Continued)

(52) U.S. Cl.
CPC .............. *F15B 15/125* (2013.01); *B25J 9/046* (2013.01); *B25J 9/146* (2013.01); *B25J 15/0009* (2013.01)

(58) Field of Classification Search
CPC ........ B25J 15/0009; B25J 9/046; B25J 9/146; B25J 17/00; B25J 18/025; F16H 29/02;
(Continued)

(56) References Cited

U.S. PATENT DOCUMENTS 702,117 A      6/1902   Taylor
860,619 A  *   7/1907   Pagendarm ............. B60T 11/10
                                                                60/569
(Continued)

FOREIGN PATENT DOCUMENTS

CN          1798629 A      7/2006
CN        101109094 A      1/2008
(Continued)

OTHER PUBLICATIONS

Notice of Allowance and Fee(s) Due for U.S. Appl. No. 14/485,180, filed Sep. 12, 2014, and mailed from the USPTO dated Jan. 23, 2017, 8 pgs.
(Continued)

*Primary Examiner* — Michael Leslie
*Assistant Examiner* — Dustin T Nguyen
(74) *Attorney, Agent, or Firm* — Stoel Rives LLP

(57) ABSTRACT

Devices and systems for producing rotational actuation are described. More specifically, hydraulic and pneumatic actuators that can produce and control rotational or joint-like motion are described. An actuator may be configured to allow parallel coupling of multiple actuators, and thus increase the range of rotation of the actuators when considered collectively.

5 Claims, 23 Drawing Sheets

(51) Int. Cl.
  *B25J 9/04* (2006.01)
  *B25J 15/00* (2006.01)
(58) Field of Classification Search
  CPC ............ F15B 15/125; F15B 2211/7107; F15B 2211/7057; F15B 15/16; F15B 15/165
  USPC .......... 60/484; 92/120, 67, 146, 151; 901/22, 901/37
  See application file for complete search history.

(56) References Cited

U.S. PATENT DOCUMENTS

| | | | |
|---|---|---|---|
| 1,802,281 | A | 4/1931 | Shimer |
| 1,892,187 | A * | 12/1932 | Drennon ................ B64C 11/42 416/157 R |
| 2,657,538 | A * | 11/1953 | Myers .................. F15B 15/125 92/120 |
| 2,936,636 | A | 5/1960 | Wacht |
| 2,996,049 | A * | 8/1961 | Huska ................... F16K 31/12 92/120 |
| 3,246,580 | A | 4/1966 | Huska |
| 3,446,120 | A * | 5/1969 | Sneen .................... F01C 1/063 92/120 |
| 3,731,597 | A * | 5/1973 | Payne .................. F15B 15/125 92/120 |
| 3,945,892 | A | 3/1976 | James et al. |
| 3,999,904 | A | 12/1976 | Raymond |
| 4,001,556 | A | 1/1977 | Folchi et al. |
| 4,013,535 | A | 3/1977 | White |
| 4,067,093 | A | 1/1978 | Schumacher et al. |
| 4,241,816 | A | 12/1980 | Hubrecht et al. |
| 4,242,947 | A * | 1/1981 | Renner ................. F15B 15/125 92/108 |
| 4,323,850 | A | 4/1982 | Dawson et al. |
| 4,356,554 | A * | 10/1982 | Susnjara ................ B25J 9/046 414/730 |
| 4,459,898 | A * | 7/1984 | Harjar ...................... B25J 9/08 174/86 |
| 4,481,815 | A | 11/1984 | Overton |
| 4,492,949 | A | 1/1985 | Peterson et al. |
| 4,499,784 | A | 2/1985 | Shum |
| 4,547,120 | A | 10/1985 | Turner, Jr. et al. |
| 4,555,953 | A | 12/1985 | Dario et al. |
| 4,561,816 | A * | 12/1985 | Dingess ............... B23K 9/0288 165/11.1 |
| 4,572,564 | A | 2/1986 | Cipolla |
| 4,588,348 | A | 5/1986 | Beni et al. |
| 4,615,512 | A | 10/1986 | Hoke |
| 4,638,670 | A | 1/1987 | Moser |
| 4,745,844 | A | 5/1988 | Larsen |
| 4,766,389 | A | 8/1988 | Rhoades et al. |
| 4,770,455 | A | 9/1988 | Collins, Jr. |
| 4,781,103 | A * | 11/1988 | Maruyama ............... B25J 9/148 414/730 |
| 4,817,440 | A | 4/1989 | Curtin |
| 4,823,071 | A | 4/1989 | Ding et al. |
| 4,841,224 | A | 6/1989 | Chalupnik et al. |
| 4,845,457 | A | 7/1989 | Nakanishi |
| 4,886,467 | A | 12/1989 | Peveto |
| 4,896,914 | A | 1/1990 | Stevens |
| 4,908,574 | A | 3/1990 | Rhoades et al. |
| 4,936,743 | A | 6/1990 | Stoss |
| 4,980,646 | A | 12/1990 | Zemel |
| 4,991,491 | A | 2/1991 | Neumann |
| 5,003,517 | A | 3/1991 | Greer, Jr. |
| 5,011,207 | A | 4/1991 | Stevens |
| 5,025,126 | A | 6/1991 | Hansen |
| 5,044,257 | A | 9/1991 | Scobie |
| 5,092,645 | A | 3/1992 | Okada |
| 5,114,300 | A | 5/1992 | Shahinpoor et al. |
| 5,114,859 | A | 5/1992 | Kagenow |
| 5,125,759 | A | 6/1992 | Chun |
| 5,203,748 | A | 4/1993 | Sawada et al. |
| 5,233,293 | A | 8/1993 | Huang et al. |
| 5,403,057 | A | 4/1995 | Sugito et al. |
| 5,407,185 | A | 4/1995 | Zehnpfennig et al. |
| 5,413,454 | A | 5/1995 | Movsesian |
| 5,495,791 | A * | 3/1996 | Sande ..................... F01C 9/002 92/120 |
| 5,565,625 | A | 10/1996 | Howe et al. |
| 5,602,487 | A | 2/1997 | Manku |
| 5,793,640 | A | 8/1998 | Wu et al. |
| 5,897,156 | A | 4/1999 | Hayard et al. |
| 5,911,158 | A | 6/1999 | Henderson et al. |
| 5,920,015 | A | 7/1999 | Hallberg et al. |
| 5,959,455 | A | 9/1999 | Brown |
| RE36,498 | E | 1/2000 | Howe et al. |
| 6,011,627 | A | 1/2000 | Mulligan et al. |
| 6,042,965 | A | 3/2000 | Nestler et al. |
| 6,067,862 | A | 5/2000 | Murray et al. |
| 6,082,196 | A | 7/2000 | Nonoyama et al. |
| 6,086,060 | A | 7/2000 | Berthold |
| 6,114,862 | A | 9/2000 | Tartagni et al. |
| 6,191,723 | B1 | 2/2001 | Lewis |
| 6,209,443 | B1 | 4/2001 | Perez |
| 6,444,488 | B2 | 9/2002 | Charrier et al. |
| 6,445,053 | B1 | 9/2002 | Cho |
| 6,448,621 | B1 | 9/2002 | Thakur |
| 6,484,068 | B1 | 11/2002 | Yamamoto et al. |
| 6,496,021 | B2 | 12/2002 | Tartagni et al. |
| 6,538,410 | B2 | 3/2003 | Mori et al. |
| 6,586,810 | B2 | 7/2003 | Thakur |
| 6,591,685 | B2 | 7/2003 | Kraetzl et al. |
| 6,604,426 | B2 | 8/2003 | Kraetzl |
| 6,661,239 | B1 | 12/2003 | Ozick |
| 6,684,754 | B2 | 2/2004 | Comer |
| 6,707,290 | B2 | 3/2004 | Nyce et al. |
| 6,724,201 | B2 | 4/2004 | Sato et al. |
| 6,764,373 | B1 | 7/2004 | Osawa et al. |
| 6,909,940 | B2 | 6/2005 | Hellman et al. |
| 6,922,158 | B2 | 7/2005 | Ymker |
| 6,938,938 | B2 | 9/2005 | Risle et al. |
| 6,995,649 | B2 | 2/2006 | Nugent |
| 7,118,601 | B2 | 10/2006 | Yasui et al. |
| 7,168,758 | B2 | 1/2007 | Bevan et al. |
| 7,212,007 | B2 | 5/2007 | Yasuda et al. |
| 7,219,551 | B2 | 5/2007 | Suzuki |
| 7,331,094 | B2 | 2/2008 | Berninger |
| 7,498,758 | B2 | 3/2009 | Baba et al. |
| 7,570,065 | B2 | 8/2009 | Harish et al. |
| 7,591,165 | B2 | 9/2009 | Papakostas et al. |
| 7,610,811 | B1 | 11/2009 | Wang et al. |
| 7,658,119 | B2 | 2/2010 | Loeb et al. |
| 7,734,375 | B2 | 6/2010 | Buehler et al. |
| 7,878,075 | B2 | 2/2011 | Johansson et al. |
| 7,895,935 | B2 * | 3/2011 | Kells .................... F15B 15/125 92/120 |
| 7,904,200 | B2 | 3/2011 | Takenaka et al. |
| 7,938,038 | B2 | 5/2011 | Sugawara et al. |
| 7,951,477 | B2 | 5/2011 | Wood et al. |
| 8,012,100 | B2 | 9/2011 | Ward |
| 8,033,189 | B2 | 10/2011 | Hayakawa et al. |
| 8,079,278 | B2 | 12/2011 | Xi et al. |
| 8,081,299 | B2 | 12/2011 | Kim et al. |
| 8,097,986 | B2 | 1/2012 | Kimura et al. |
| 8,126,592 | B2 | 2/2012 | Saunders et al. |
| 8,173,285 | B2 | 5/2012 | Dougherty |
| 8,181,540 | B2 | 5/2012 | Loeb et al. |
| 8,235,732 | B2 | 8/2012 | Garascia et al. |
| 8,341,158 | B2 | 12/2012 | Acharya |
| 8,342,440 | B2 | 1/2013 | Papanikolopoulos et al. |
| 8,364,312 | B2 | 1/2013 | Tobey |
| 8,415,957 | B2 | 4/2013 | Huang et al. |
| 8,446,157 | B2 | 5/2013 | Fröjd |
| 8,485,576 | B2 | 7/2013 | Melville et al. |
| 8,515,579 | B2 | 8/2013 | Alcazar et al. |
| 8,955,425 | B2 * | 2/2015 | Sobolewski .......... F15B 15/125 92/120 |
| 9,156,172 | B2 | 10/2015 | Rose et al. |
| 9,205,567 | B2 | 12/2015 | Rose et al. |
| 9,234,535 | B2 * | 1/2016 | Kim ..................... F15B 15/125 |
| 9,375,852 | B2 | 6/2016 | Rose et al. |
| 10,273,661 | B2 * | 4/2019 | Shahroudi ............ F15B 15/125 |

(56) References Cited

U.S. PATENT DOCUMENTS

| | | |
|---|---|---|
| 2002/0007230 A1 | 1/2002 | Ueno et al. |
| 2003/0136258 A1 | 7/2003 | Bunyard et al. |
| 2004/0102274 A1 | 5/2004 | Tesar |
| 2004/0186626 A1 | 9/2004 | Tsukamoto et al. |
| 2004/0197179 A1 | 10/2004 | Achkire et al. |
| 2005/0187657 A1 | 8/2005 | Hashimoto et al. |
| 2005/0283043 A1 | 12/2005 | Sisk |
| 2007/0256555 A1* | 11/2007 | Koop ............... B66B 9/04 92/146 |
| 2008/0187391 A1 | 8/2008 | Mimken |
| 2009/0031718 A1 | 2/2009 | Kells |
| 2009/0088896 A1 | 4/2009 | Tobey |
| 2010/0010670 A1* | 1/2010 | Matsukuma ......... B25J 9/104 700/245 |
| 2010/0071545 A1 | 3/2010 | Raubacher |
| 2012/0198955 A1* | 8/2012 | Hayashi ............ B25J 9/0009 74/490.05 |
| 2013/0104729 A1 | 5/2013 | Ito et al. |
| 2013/0133513 A1 | 5/2013 | Ito |
| 2013/0152566 A1 | 6/2013 | Childers et al. |
| 2013/0233116 A1 | 9/2013 | Rose et al. |
| 2014/0238226 A1* | 8/2014 | Kim ................. B64C 13/40 92/2 |
| 2014/0238227 A1 | 8/2014 | Kim et al. |
| 2014/0238230 A1 | 8/2014 | Kim et al. |
| 2015/0019013 A1 | 1/2015 | Rose et al. |
| 2015/0283709 A1* | 10/2015 | Dalakian ........... B25J 17/025 74/490.04 |
| 2016/0177722 A1 | 6/2016 | Ito et al. |
| 2017/0051764 A1 | 2/2017 | Rose et al. |

FOREIGN PATENT DOCUMENTS

| | | |
|---|---|---|
| EP | 0 582 731 A1 | 2/1994 |
| GB | 1174028 A | 12/1969 |
| GB | 2434840 B | 10/2011 |
| GB | 2522744 A | 8/2015 |
| JP | 06-151997 | 5/1994 |
| JP | 07-197928 A | 8/1995 |
| JP | 2003-159689 A | 6/2003 |
| WO | WO 9314386 A1 | 7/1993 |
| WO | 0045049 A1 | 8/2000 |
| WO | 2000045049 A1 | 8/2000 |
| WO | WO 2009/058359 A1 | 5/2009 |
| WO | WO 2010/133006 A1 | 11/2010 |
| WO | WO 2012/049535 A1 | 4/2012 |

OTHER PUBLICATIONS

International Search Report and Written Opinion for International Application No. PCT/US16/47072 filed Aug. 15, 2016, and mailed from the International Searching Authority dated Jan. 24, 2017, 17 pgs.
Pratt, Dr. Gill et al., "DARPA Robotics Challenge Proposers' Day," Apr. 16, 2012, pp. 1-80.
Brockett, Roger W. et al., "Robotic Manipulation: Harvard Robotics Laboratory," http://hrl.harvard.edu/manipulation/, © 2003-2004 Harvard Robotics Laboratory and the authors, 2 pgs.
Ferrier, Nicola J. et al., "Reconstructing the Shape of a Deformable Membrane from Image Data," The International Journal of Robotics Research, vol. 19, No. 8, Aug. 2000, © 2000 Sage Publications, Inc., pp. 1-22.
Vásárhelyi, Gábor, "The Design of Tactile Sensors and Their Elastic Cover," Péter Pázmány Catholic University, Faculty of Information Technology, Multidisciplinary Technical Sciences Doctoral School, Budapest 2007, pp. 1-19.
Condliffe, Jamie, "This Robotic Finger Is More Sensitive Than Yours," http://gizmodo.com/5919516/this-robotic-finger-is-more-sensitive-than-yours, Jun. 19, 2002, 4 pgs.
Dunham, Katie, "USC Viterbi researchers work on a robot's touch," USC News, http://news.usc.edu/, Jun. 20, 2012, 3 pgs.
"Demystifying Piezoresistive Pressure Sensors," http://www.maximintegrated.com/app-notes/index.mvp/id/871, Jul. 17, 2002, 7 pgs.
"Piezoresistive Sensors," Chapter 6, LiuCh06v3.qxd, http://www.mech.northwestern.edu/FOM/LiuCh06v3_072505.pdf, Jul. 25, 2005, pp. 207-244.
Cook, Phillip, "How to Make an Ag/AgCl Reference Electrode—YouTube," uploaded Jul. 31, 2008, http://www.youtube.com/watch?v=JOR8DWH2PXE, 2 pgs.
Malkin, Robert A. et al., "Construction of a very high-density extracellular electrode array," American Journal of Physiology—Heart and Circulatory Physiology, submitted Aug. 9, 1999, accepted in final form Dec. 29, 1999, http://ajpheart.physiology.org/content/279/1/H437.full, 12 pgs.
Valdés-Ramírez, G. et al., "Design and Construction of Solid State Ag/AgCl Reference Electrodes Through Electrochemical Deposition of Ag and AgCl Onto a Graphite/Epoxy Resin-Based Composite Parte 1: Electrochemical Deposition of Ag Onto a Graphite/Epoxy Resin-Based Composite," International Journal of Electrochemical Science, 6 (2011), http://www.electrochemsci.org/papers/vol6/6040971.pdf, pp. 971-987.
"The Silver/Silver Chloride Reference Electrode," Tanner's General Chemistry, http://tannerm.com/ag_ref.htm, © 2008 Tanner McCarron and Weston McCarron, 6 pgs.
"A new highly stable silver/silver-chloride electrode," Medical & Biological Engineering & Computing, http://resources.metapress.com/pdf-preview.axd?code=hl731174r737v716&size=largest, Nov. 1977, 1 pg.
Ansuini, Frank J. et al., "Factors Affecting the Accuracy of Reference Electrodes," Cathodic & Anodic Protection, reprinted from Materials Performance, vol. 33, No. 11, Nov. 1994, © 1994 NACE International, pp. 14-17.
"PH, Theory and Practice," http//www.radiometer-analytical.com/pdf/ph_theory.pdf, © Radiometer Analytical SAS, France, 2007-11G, 38 pgs.
Ross, Jordan, "Liquid metal thermal interface materials by Indium Corporation," http://www.indium.com/thermal-interface-materials/other/liquid-metal/, ©1996-2013 Indium Corporation, 3 pgs.
Dickey, Michael D. et al., "Eutectic Gallium-Indium (EGaIn): A Liquid Metal Alloy for the Formation of Stable Structures in Microchannels at Room Temperature**," http://gmwgroup.harvard.edu/pubs/pdf/1014.pdf, © 2008 WILEY-VCH GmbH & Co. KGaA, Weinheim, pp. 1097-1104.
"Dielectric Constant Measurement of Solid Materials," Application Note 380-1, Using HP 1645 1B Dielectric test fixture, http://www.hpmemory.org/an/pdf/an_380-1.pdf, © 1998 Hewlett-Packard Company, 8 pgs.
"Pololu robotics forum—View topic—Concept; 3-way mobile joint," http://forum.pololu.com/viewtopic.php?f=1&t=819, Feb. 22, 2008, pp. 1-8.
Trinkel, Bud, Fluid Power Ebook Edition 1, eBooks content from Hydraulics & Pneumatics, http://hydraulicspneumatics.com/ebooks/fluid-power-ebook-edition-1-0, Jun. 25, 2007, 4 pgs.
Trinkel, Bud, Fluid Power Ebook Edition 2, eBooks content from Hydraulics & Pneumatics, http://hydraulicspneumatics.com/ebooks/fluid-power-ebook-edition-2-0, Jun. 25, 2007, 3 pgs.
"Book 2, Chapter 19: Rotary actuators, Other Technologies content from Hydraulics & Pneumatics," http://hydraulicspneumatics.com/other-technologies/book-2-chapter-19-rotary-actuators, May 19, 2010, 16 pgs.
International Search Report and Written Opinion for PCT/US2013/029798 filed Mar. 8, 2013, and mailed from the International Searching Authority dated Aug. 23, 2013, 20 pgs.
Atsuo Takanishi, Biped humanoid robot group, WABIAN-2R (2006-), Copyright (C) 2009, last update Nov. 30, 2010.
Takanishi Laboratory, Biped Humanoid Robot, Research Paper, Copyright (C) 2010, last update Nov. 17, 2010.
Moll, A Self-sealing Fiber-reinforced Composite, Journal of Composite Materials, vol. 0, No. 00/2009, © The Author(s), 2009, published Jan. 5, 2010.
Non-Final Office Action for U.S. Appl. No. 13/854,710 filed Apr. 1, 2013, and mailed from the USPTO dated Nov. 20, 2014, 19 pgs.

(56) References Cited

OTHER PUBLICATIONS

Non-final Office Action for U.S. Appl. No. 13/790,801 filed Mar. 8, 2013, and mailed from the USPTO dated Apr. 8, 2015, 35 pgs.
Notice of Allowance and Fee(s) Due for U.S. Appl. No. 13/854,710 filed Apr. 1, 2013, and mailed from the USPTO dated Apr. 16, 2015, 5 pgs.
Notice of Allowance and Fee(s) Due for U.S. Appl. No. 13/854,710 filed Apr. 1, 2013, and mailed from the USPTO dated Aug. 28, 2015, 6 pgs.
Non-Final Office Action for U.S. Appl. No. 13/854,693 filed Apr. 1, 2013, and mailed from the USPTO dated Oct. 6, 2015, 22 pgs.
Notice of Allowance and Fee(s) Due for U.S. Appl. No. 13/790,801 filed Mar. 8, 2013, and mailed from the USPTO dated Oct. 29, 2015, 14 pgs.
Notice of Allowance and Fee(s) Due for U.S. Appl. No. 13/854,693 filed Apr. 1, 2013, and mailed from the USPTO dated Apr. 20, 2016, 11 pgs.
International Preliminary Report on Patentability for PCT/US2016/047072 filed Aug. 15, 2016, and mailed from the International Bureau dated Mar. 8, 2018, 9 pgs.
International Search Report and Written Opinion dated Feb. 6, 2018 for PCT/US2017/062678.
16839819.6, Extended European Search Report, dated Mar. 27, 2019, 9 pages.
U.S. Appl. No. 15/821,501, Non-Final Office Action, dated Dec. 13, 2019, 19 pages.

* cited by examiner

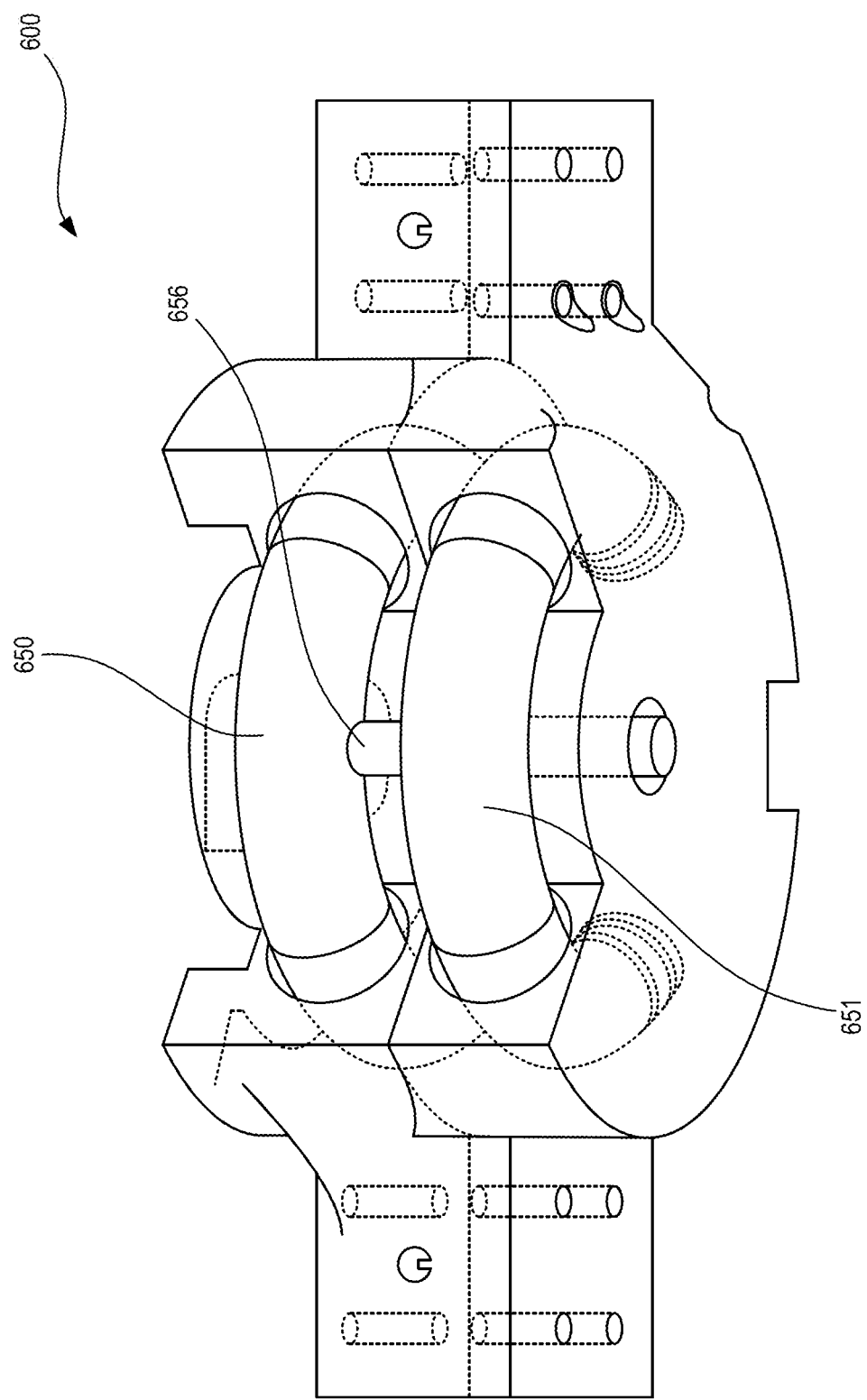

DEVICES AND SYSTEMS FOR PRODUCING ROTATIONAL ACTUATION

RELATED APPLICATIONS

This application claims priority to U.S. Provisional Patent Application 62/208,250, filed Aug. 21, 2015, and titled "DEVICES AND SYSTEMS FOR PRODUCING ROTATIONAL ACTUATION," the entire disclosure of which is hereby incorporated herein by this reference.

TECHNICAL FIELD

This disclosure relates to devices and systems for producing rotational actuation. More particularly, this disclosure relates to actuators for producing and controlling rotational motion.

BRIEF DESCRIPTION OF THE DRAWINGS

Non-limiting and non-exhaustive embodiments of the disclosure are described, including various embodiments of the disclosure with reference to the figures, in which:

FIG. 6C is another perspective view of the joint assembly of FIG. 6A, with two piston linkage mechanisms coupled by an actuator linkage mechanism.

DETAILED DESCRIPTION

The embodiments of dual directional actuators described herein may include a toroidal actuation chamber formed by at least one actuation cylinder. Coupled pistons may be disposed in the actuation chamber. A fluid media (e.g., hydraulic fluid or air) may flow into the actuation cylinders and may cause operation of the dual directional actuator. Further, certain embodiments may include coupling a plurality of dual directional actuators together to increase an effective rotational range of the coupled actuators or to increase the torque of rotational actuation.

The embodiments of the disclosure will be best understood by reference to the drawings, wherein like parts are designated by like numerals throughout. Components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

Figure 1:
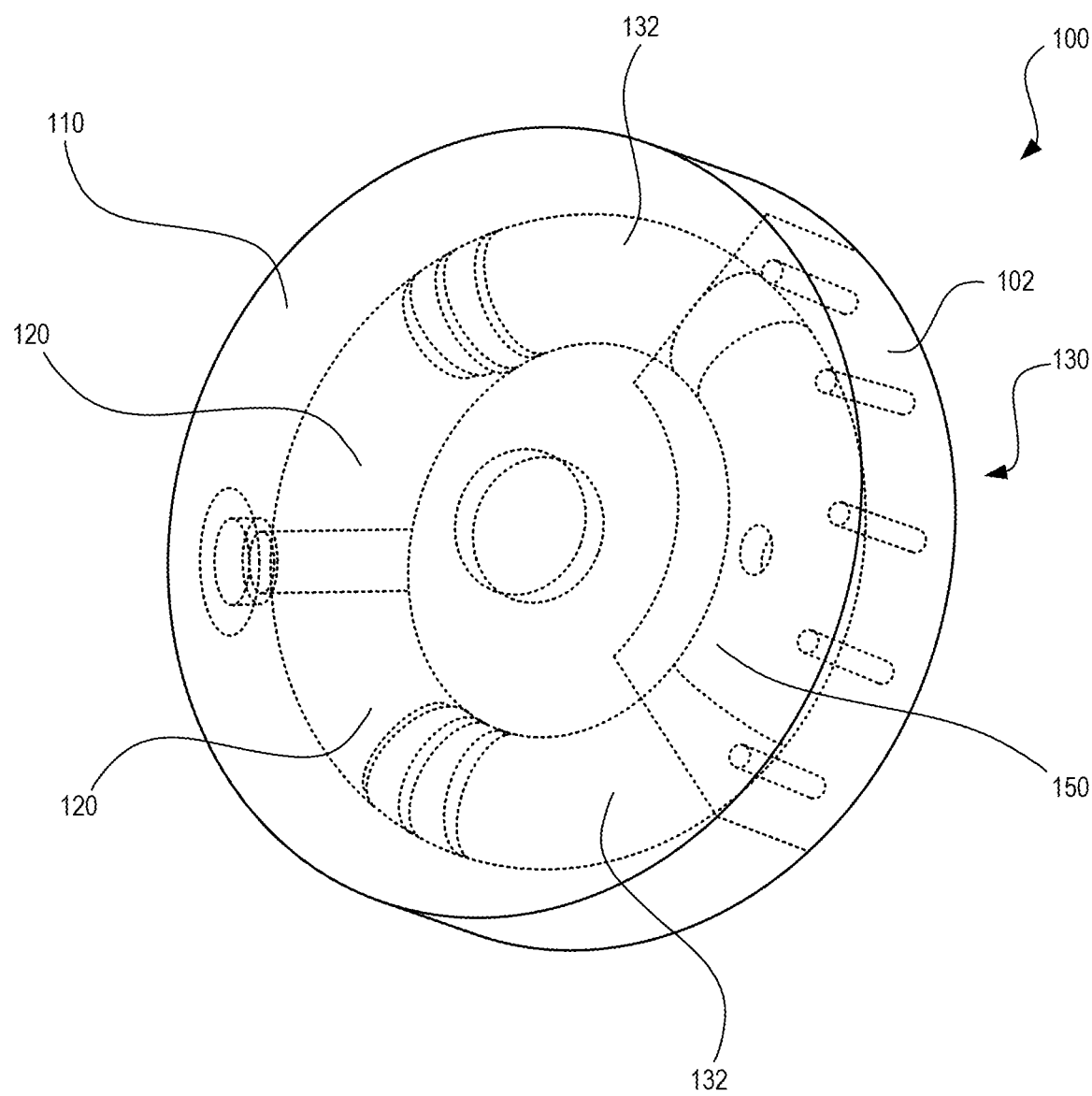
FIG. 1 is a torus-shaped dual directional actuator, according to one embodiment of the present disclosure with two single actuation cylinders.

FIG. 1 is a torus-shaped dual directional actuator 100, according to one embodiment of the present disclosure. The actuator 100 includes two actuation cylinders 120, an inner (e.g., piston) assembly 130, and a guide mechanism 102. The actuation cylinders 120 may be defined by a body or housing 110 of the actuator 100, and may be coupled together in a toroidal shape.

A cross-section of the toroidal shape may be circular, elliptical, or polygonal and may or may not be symmetrical and/or include one or more flattened surfaces. Each actuation cylinder 120 may include a fluid port (not shown) to allow a fluid media (e.g., hydraulic fluid, air, or other suitable fluid) to flow into or out of each of the actuation cylinders 120.

The piston assembly 130 may include two pistons 132. Each piston 132 may be disposed within an interior of the toroidal actuation cylinders 120 (e.g., within a single cylinder or portions of both cylinders). The piston assembly 130 may further include a linkage mechanism or more specifically a piston linkage mechanism 150. The linkage mechanism 150 may couple the pistons 132 together. More specifically, the linkage mechanism 150 may connect, support, and guide rotation of the two pistons 132 during operation of the dual directional actuator 100.

In certain embodiments, the pistons 132 may form a single piston with two piston heads. The single piston may travel between the two actuation cylinders 120 as part of a dual actuation bi-directional actuator 100. In some embodiments, the linkage mechanism 150 may rotate in-line with the pistons 132, with the pistons 132 and the linkage mechanism 150 rotating about a common radius of rotation (e.g., the center of the diskshaped actuator housing 110).

The guide or support mechanism 102 may act as a bearing or sidewall of the actuator 100. Further, the guide mechanism 102 may support or guide the coupled pistons 132 as they travel within the actuation cylinders 120 (e.g., during operation of the dual directional actuator 100). The guide mechanism 102 may be coupled to the actuator housing 110 by a series of pins, screws, clamps, or other suitable fasteners.

Certain embodiments of a dual directional actuator may operate via hydraulic or pneumatic means. More specifically, certain embodiments may pump hydraulic fluid through the actuation cylinders 120, and other embodiments may pump air or other fluids through the actuation cylinders 120. Accordingly, the actuator 100 may include seal components and configurations thereof which may facilitate retention of any fluid traveling within the actuator 100 or actuation cylinders 120.

For example, one or more sealing components or fluid channels may be integrated into or formed by one or more actuation cylinders 120 or pistons 132 of the embodiment. Additionally, the pistons 132 may be configured to couple with seals, O-rings, washers, and other suitable sealing components or wear ring technologies, which may prevent or substantially inhibit leakage of fluid from the actuation cylinders 120.

In some embodiments, the piston assembly 130 can be initially inserted into the actuation cylinders 120 as discrete uncoupled parts. Stated differently, the piston assembly 130 may be inserted into the actuator 100 as individual and uncoupled pieces or components. Once inserted, the pistons 132 may be coupled together by the piston linkage mechanism 150 and the support mechanism 102 may be coupled to the actuator 100.

Figure 2:
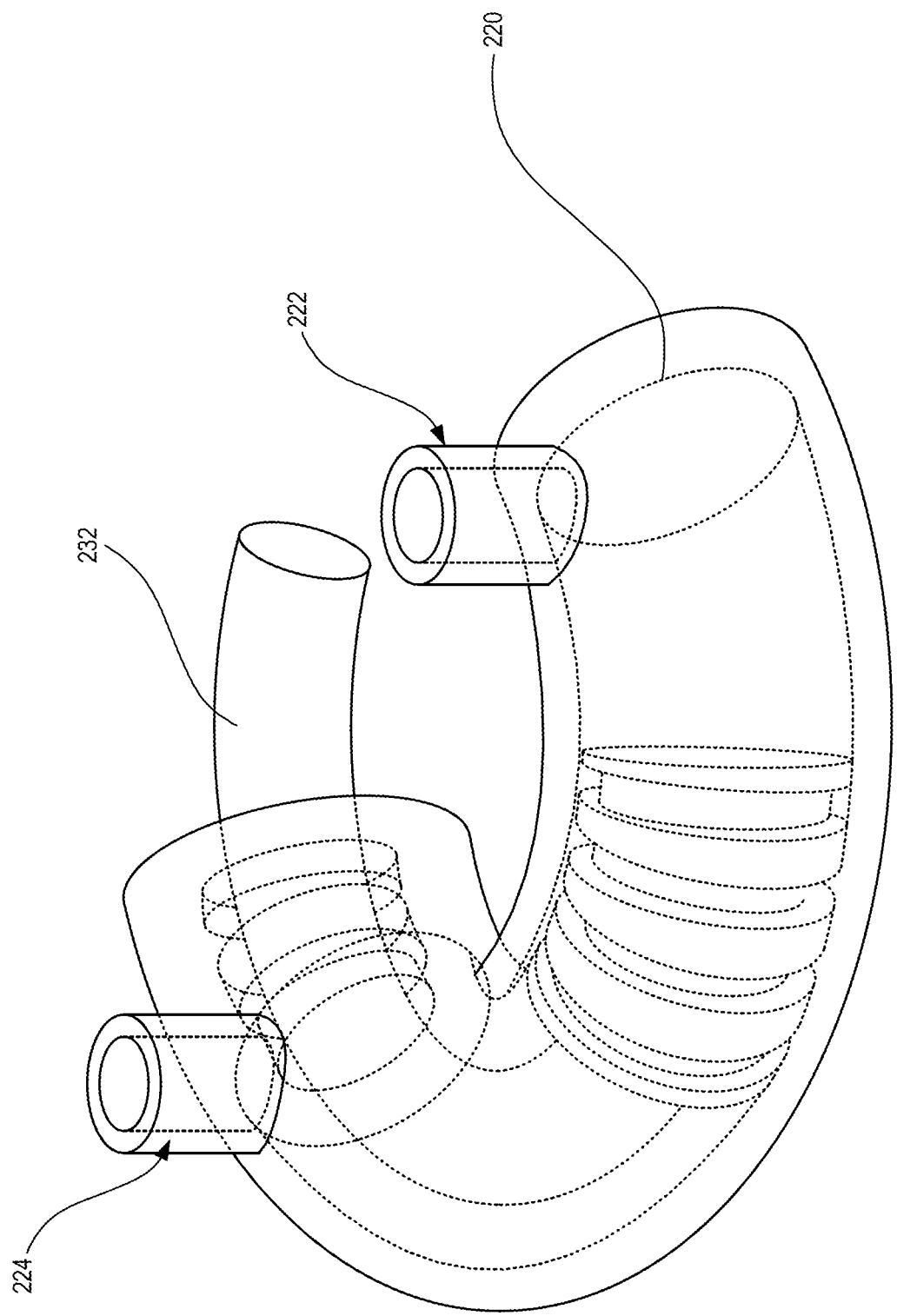
FIG. 2 is a piston of a dual directional actuator disposed in an extension and retraction chamber, according to one embodiment of the present disclosure with one dual actuation cylinder.

FIG. 2 is a perspective view of a dual directional actuator according to one embodiment of the present disclosure. A dual directional actuator may also be described as a rotating cylinder configured with hydraulic and/or pneumatic seal rings. Stated differently, a dual directional actuator may be described as a torus-shaped hydraulic cylinder with a piston extension and a retraction chamber.

The actuator of FIG. 2 is a dual directional hydraulic actuator and includes two fluid ports 222, 224, with a fluid port on either end of a piston 232 (e.g., proximal to the piston base and proximal to the piston head). The piston 232 may travel in a forward or backward direction within an actuation cylinder 220 based on the direction of fluid flow into or out of each of the fluid ports 222, 224. Piston seals and rod seals (not shown) may be incorporated into the actuator.

The actuation cylinder 220 may be filled and drained of a fluid media through the fluid ports 222, 224 which may control and/or produce rotation of the piston 232 (and the actuator as a whole). The dual directional actuator may be coupled to a valve assembly (not shown). The valve assembly may include fluid flow direction controls and/or switching components to determine which actuation cylinder receives the fluid media (e.g., from a pump in fluid communication with the corresponding fluid port).

Simultaneously, the valve assembly may determine which actuation cylinder communicates or drains fluid (e.g., to a fluid reservoir in fluid communication with the corresponding fluid port). The valve assembly, while coupled to one or more dual directional actuators, may control the direction of rotation of the actuators by producing a flow of a fluid media in the corresponding direction within the actuation cylinders.

Figure 3:
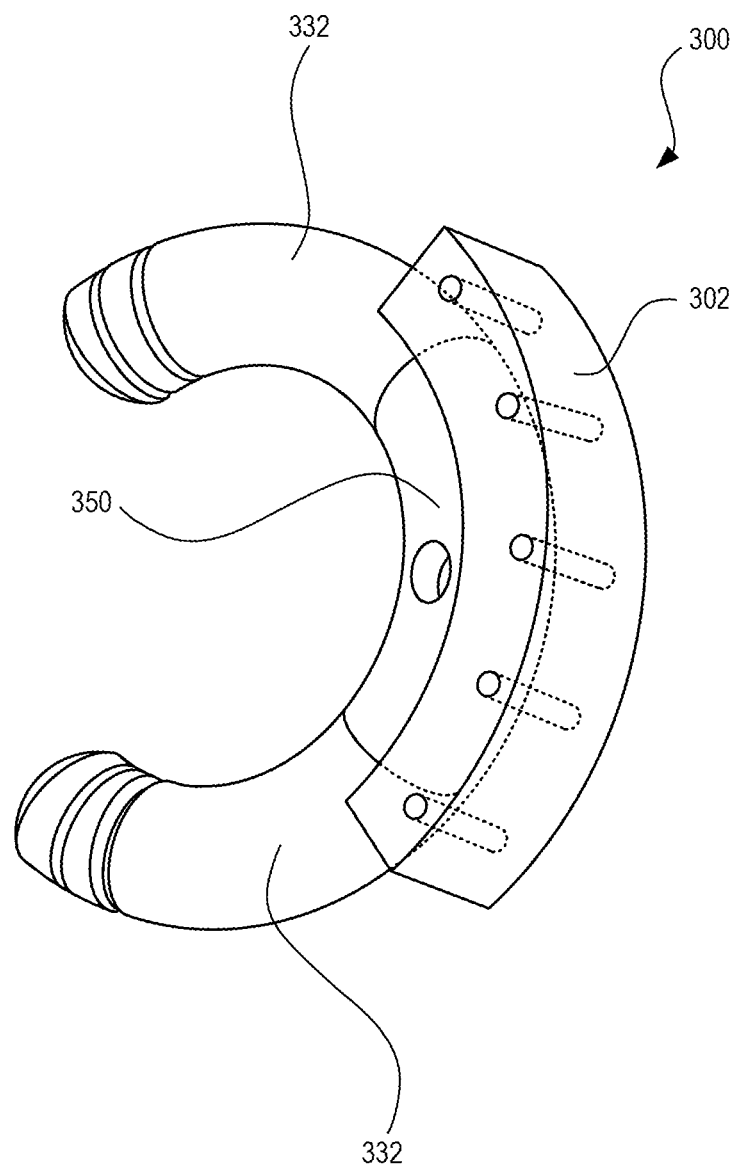
FIG. 3 is a piston and a piston linkage assembly with a support guide/bearing, according to one embodiment of the present disclosure.

FIG. 3 is a perspective view of a piston assembly 300 that has been removed from an actuator housing. The piston assembly 300 includes a linkage mechanism 350 coupling two pistons 332 together, and a guide mechanism 302.

Some embodiments of a dual directional actuator may include a connector or fastener (not shown) between individual pistons and the linkage mechanism coupling the pistons together. The fastener or connection between each piston and the linkage mechanism may stabilize rotation of the pistons and may be configured with a snap-in connection or a friction fit to facilitate assembly and coupling of the pistons and linkage mechanism.

Figure 4B:
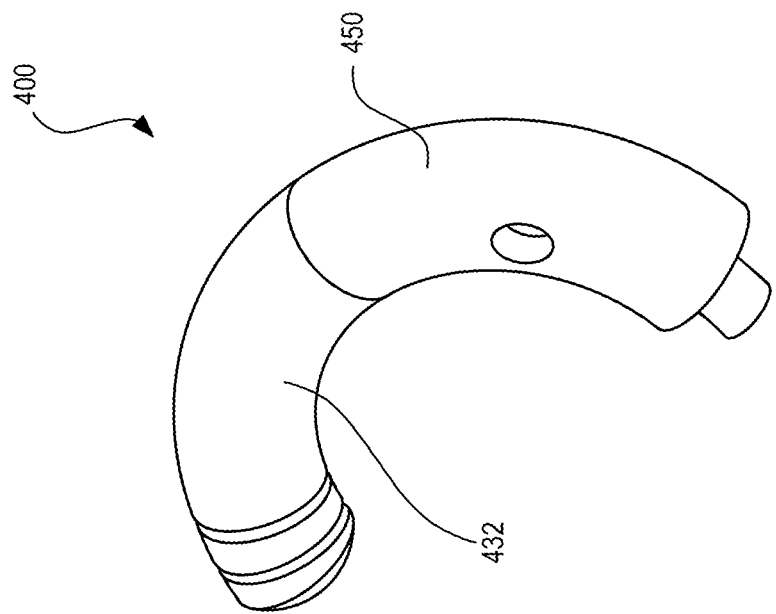
FIG. 4B is a single piston coupled to a linkage assembly, according to the embodiment of FIG. 4A.
Figure 4A:
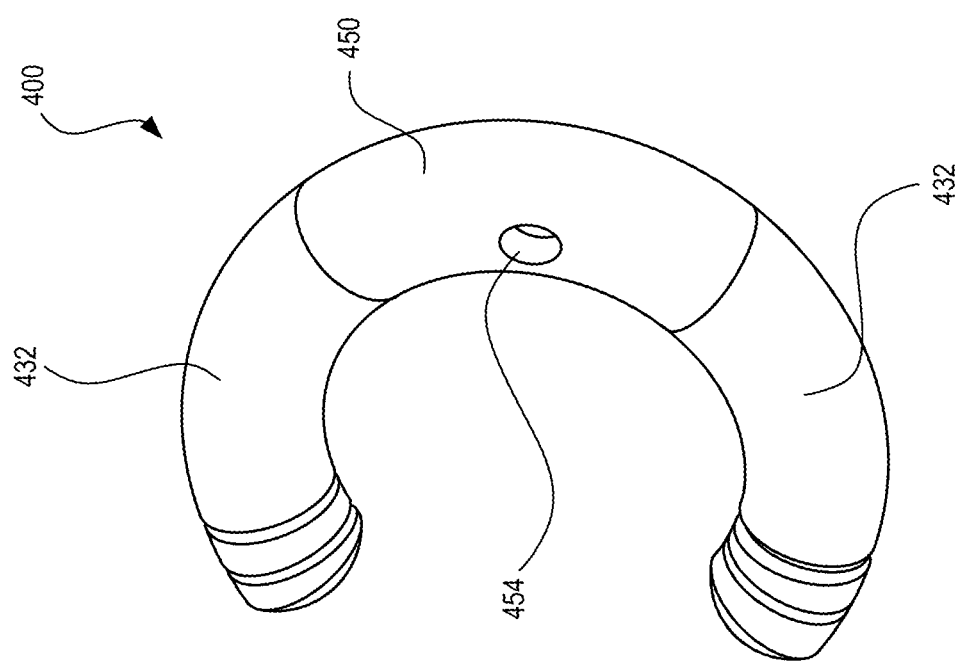
FIG. 4A is a perspective view of a two pistons coupled to a piston linkage mechanism according to one embodiment of the present disclosure.
Figure 4C:
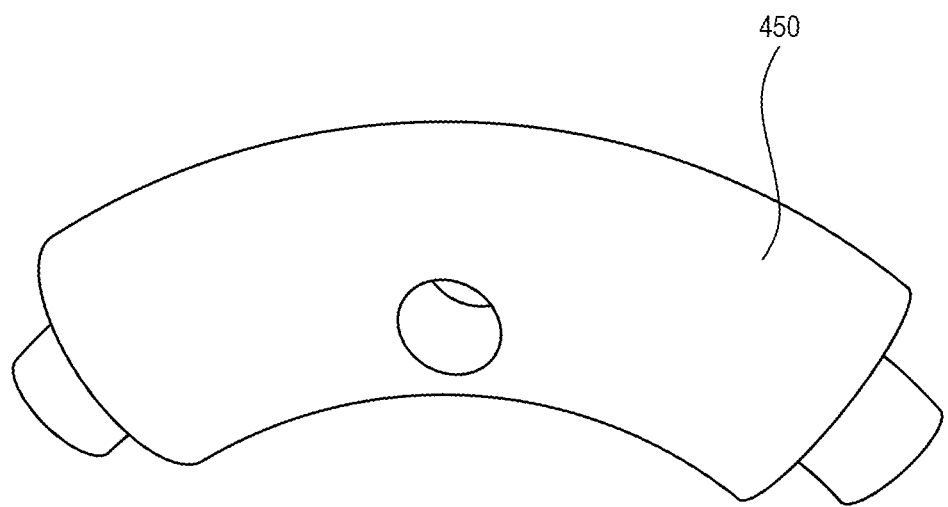
FIG. 4C is a perspective view of the piston linkage mechanism of FIG. 4A.
Figure 4D:
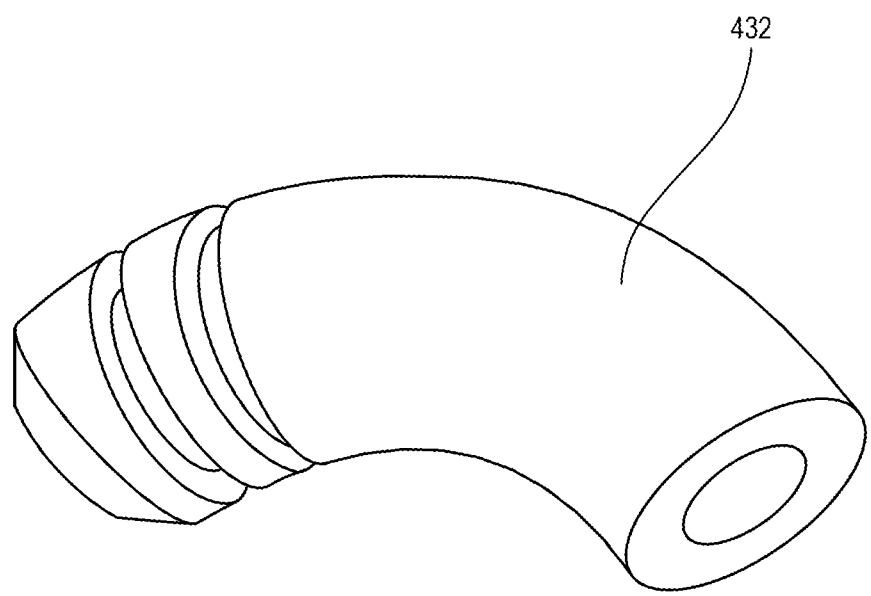
FIG. 4D is a perspective view of a piston of FIG. 4A.

FIG. 4A is a perspective view of a two pistons 432 coupled to a piston linkage mechanism 450 according to one embodiment of the present disclosure. FIG. 4B is a single piston 432 coupled to a linkage mechanism 450, according to the embodiment of FIG. 4A. FIG. 4C is a perspective view of the piston linkage mechanism 450 of FIG. 4A. The linkage mechanism 450 may include a utility aperture disposed in a center portion of the linkage mechanism 450. FIG. 4D is a perspective view of a piston 432 of FIG. 4A.

The utility aperture 454 of the linkage mechanism 450 may be configured to receive a shaft or coupling pin to enable a transfer of rotational power from an actuator to another device, object, or joint (e.g., a robotic limb or the like). Further, the utility aperture 454 may receive a coupling pin to facilitate coupling the linkage mechanism 450 to a linkage mechanism of an additional actuator.

Figure 5:
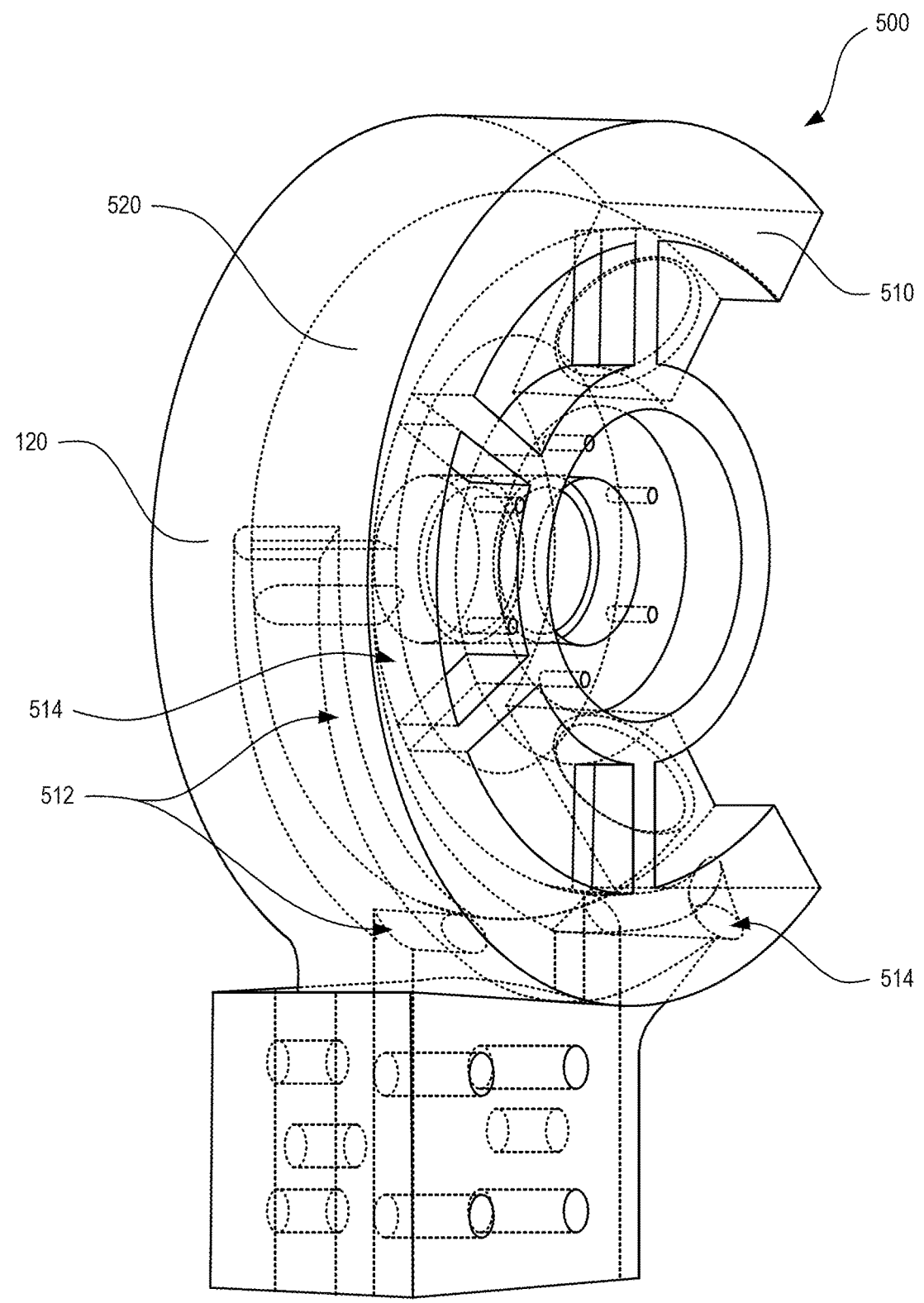
FIG. 5 is a perspective view of an internal actuator hose path, according to one embodiment of the present disclosure.

FIG. 5 is a perspective view of a dual directional actuator 500 illustrating an internal actuator hose path, according to one embodiment of the present disclosure. As described, a dual directional actuator 500 may include an actuator housing 510 to define one or more actuation cylinders 520 or other components of the actuator 500.

FIG. 5 illustrates two internal flow paths or channels 512, 514 incorporated into or defined by an actuator housing 510. The flow paths 512, 514 defined by the actuator housing 510 may allow fluid to flow to the actuation cylinders 520 and may control the direction of fluid flow to and from the actuation cylinders 520. Further, the internal flow channels 512, 514 may operate in place of or in tandem with one or more hydraulic hoses (not shown) coupled to one or more fluid ports of the actuator 500. In certain embodiments, the internal flow channels 512, 514 shown in FIG. 5 may be replaced by hydraulic hoses (not shown) coupled to the fluid ports and disposed along an outer perimeter of the actuator housing 510.

A dual directional actuator 500, with each of its components or subcomponents, may be manufactured using one or more three-dimensional printing technologies or injection molding. In such cases, any hydraulic hoses to be coupled to the actuator may be integrated as one or more internal flow channels 512, 514 coupled to one or more fluid ports.

The actuator housing 510 may define one or more internal flow channels 512, 514 to prevent or limit internal leakage of a fluid media. In other words, an actuator 500 may utilize one or more internal fluid channels 512, 514 to communicate a fluid media from a pump to one or more actuation cylinders 520 and into a fluid reservoir, or vice versa.

One or more surfaces of an actuator 500 may be configured with hard plating (e.g., nickel) after a three-dimensional print of the actuator 500, or a portion thereof, has been completed. Hard plating a portion of the actuator 500 may increase a hardness or a density of one or more surfaces (e.g., interior and/or exterior surfaces) of the plated portion of the actuator 500.

Figure 6A:
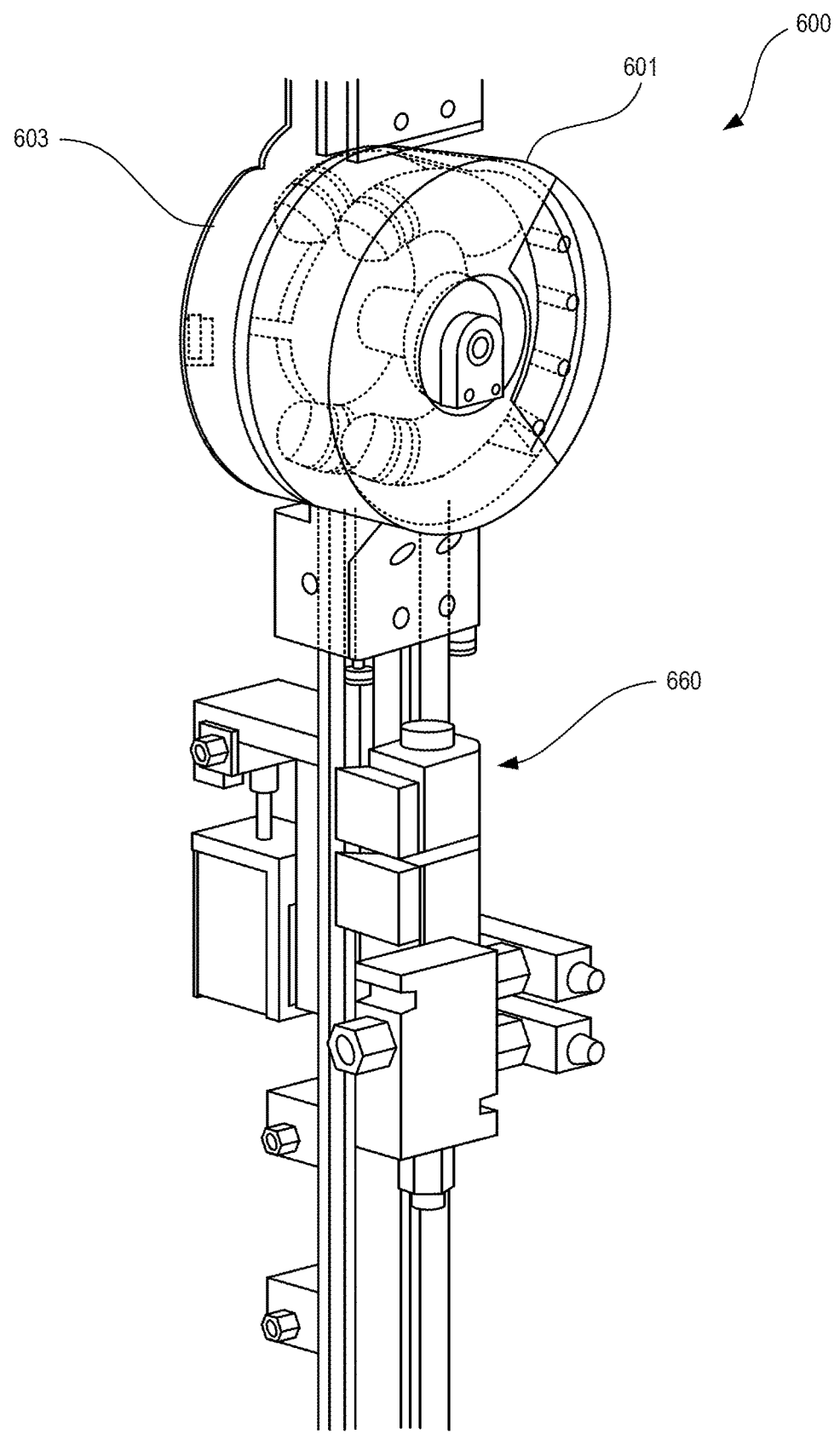
FIG. 6A is a perspective view of a joint assembly with two actuators, according to one embodiment of the present disclosure.
Figure 6B:
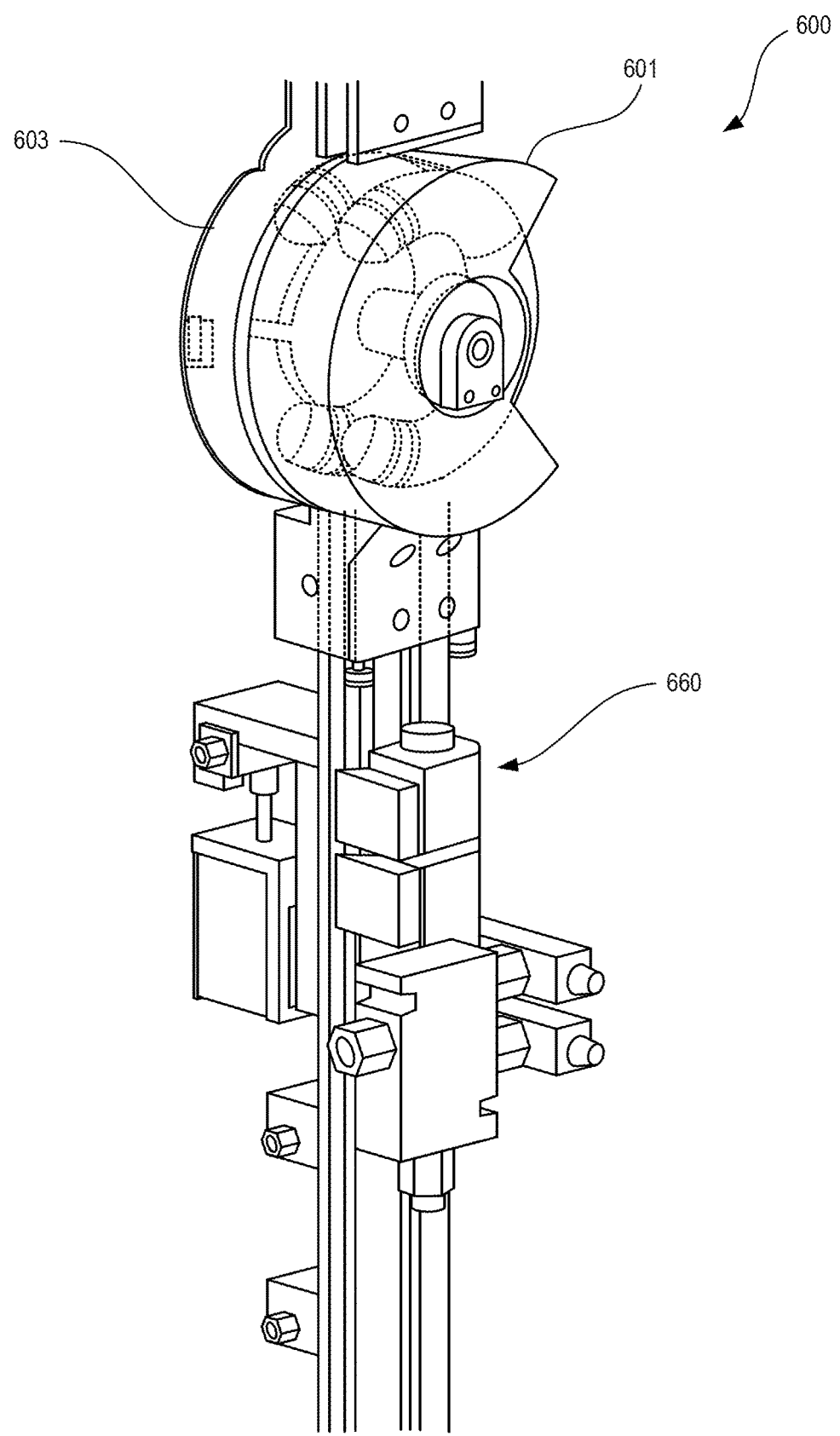
FIG. 6B is another perspective view of the joint assembly of FIG. 6A.

FIG. 6A is a perspective view of a joint (e.g., a robotic joint) assembly 600 with two dual directional actuators 601, 603 coupled together, according to one embodiment of the present disclosure. FIG. 6B is another perspective view of the joint assembly 600 of FIG. 6A. FIG. 6C is another perspective view of the joint assembly 600 of FIG. 6A, with two piston linkage mechanisms 650, 651 coupled together by an actuator linkage mechanism 656.

FIGS. 6A-6C generally and collectively illustrate a robotic joint or joint assembly 600 formed by two dual directional actuators 601, 603 coupled together. The actuators 601, 603 are coupled together by a pin 656 disposed in the linkage mechanisms 650, 651 of each actuator 601, 603. The coupled actuators 601, 603 may rotate in the same direction and about the same radius of rotation. Further, any suitable plurality of dual directional actuators may be stacked or coupled together, and each individual actuator may rotate approximately 90 degrees.

In a plurality of coupled dual directional actuators each individual actuator may rotate 90 degrees in either direction (e.g., clockwise or counterclockwise). Accordingly, two coupled actuators (e.g., actuators 601, 603) may collectively rotate up to 180 degrees. Stated differently, the coupled actuators may enable a rotational range of the robotic joint 600 that is approximately equal to 180 degrees.

More specifically, two or more actuators may be coupled together by a coupling pin 656 disposed through a utility aperture or lumen of the linkage mechanism 650, 651 of each actuator. Two or more coupled actuators may operate in a parallel configuration, and may be free floating.

A joint assembly 600 may include a plurality of linkage mechanisms 650, 651, 656, with a first linkage mechanism 650 coupling together two pistons of a single dual directional actuator 601, a second linkage mechanism 651 coupling two pistons of another actuator 603, and a third linkage mechanism 656, or coupling pin 656, coupling two or more dual directional actuators 601, 603 together. Further, the coupled actuators 601, 603 may rotate in phase or out of phase with one another, while still causing a joint to rotate in substantially the same direction. By way of non-limiting example, the actuators 601, 603 may rotate in an opposite direction for a series connection (e.g., increasing degrees of rotation), or in a same direction for a parallel connection (e.g., increasing torque).

As described, a single actuator (e.g., the actuator of FIG. 1) may rotate approximately 90 degrees. However, a plurality of actuators hydraulically and mechanically connected to rotate in series may be coupled together to enable a rotational range greater than 90 degrees. A tee may connect the ports of additional actuators such that the port alignment of a second actuator is a mirror image of a first actuator. For example, two actuators may be coupled to one another and may enable a rotational range of 180 degrees. Similarly, three actuators may be coupled to one another and may allow a rotational range of 270 degrees, and so on in greater multiples of approximately 90 degrees.

Additionally, coupling a plurality of actuators together may allow movement in complimentary or opposite directions (e.g., clockwise and counterclockwise rotation). The rotation of each actuator may be controlled by a single directional valve or valve assembly 660. The valve assembly 660 may be coupled to a plurality of ports of the actuators. Further, the valve assembly 660 may couple (e.g., fluidly couple or enable fluid communication between) similar ports (e.g., input port) in a common or parallel configuration (e.g., via at-connector).

As described, the coupling pin disposed in the linkage mechanisms may couple the actuators together. The coupling pin may extend to couple a greater number of actuators (e.g., three actuators, four actuators, etc.). One actuator may form a first half of the joint assembly, and another actuator may form a second half of the joint assembly.

A joint assembly may include a touch sensor or an array of touch sensors (e.g., linear sensor array) that may be used to describe an object being grasped by a gripping system. The sensor comprises a sensing cell that contains a stationary electrode and a movable electrode. The sensing cell is filled with a conductive fluid. The conductive fluid may convey charge between the electrodes to prevent a potential difference between the electrodes from causing an accumulation of charge. A dielectric fluid may optionally be used instead of a conductive fluid. Dielectric and conductive fluids may be referred to as electrically operative fluids. A power source is connected to the two electrodes to form a completed circuit through the conductive fluid.

Many different kinds of conductive fluid are possible including water mixed with sodium chloride, calcium chloride, or any other salt that creates an electrolyte when mixed with water; vinegar; gallium; gallium alloys; wood's metal; gallium aluminum alloy; sodium potassium alloy; and sulfuric acid. In general, the conductive fluid may comprise any salt, acid, and/or base. Non-toxic antifreeze, such as propylene glycol or glycerol, and/or toxic antifreeze, such as ethylene glycol may be added to water-based conductive fluids. Many conductive fluids are commercially available including: Indium Corporation's Gallium Alloy 46L with a melting point of 7.6 degrees Celsius; Rotometal's Gallinstan with a melting point of −19 degrees Celsius. These metals become liquid at warm temperatures and offer high conductivity. Potassium chloride is available commercially from sources, such as ColeParmer KCL 3M with saturated AgCl.

The choice of conductive fluid may depend on the cost, safety, and precision desired. Gallium alloys and sodium potassium alloy may be expensive. Sodium potassium alloy reacts violently with air when heated, but then forms an oxide coating that inhibits further reaction. Gallium aluminum alloy reacts violently with water releasing hydrogen gas and does not have any inhibiting activity. Additionally, the choice of conductive fluid will affect the requirements of the power source and electrical property measuring device. A highly conductive fluid may consume more energy unless a low voltage source is used. A more resistive fluid may consume more energy when a constant current source is used. A more sensitive electrical property measuring device may also be required for more highly conductive fluids.

One or more linear sensor arrays of the joint assembly and/or the rotational hydraulic actuators may contain conductive hydraulic fluid and prevent leaks. The hydraulic fluid in the linear sensor arrays may have positive pressure. When contact pressure is applied to the linear sensor arrays fluid may be forced out of the sensor arrays. The force from the contact pressure may act like a spring to remove the fluid, and cause the linear sensor arrays to conform to the object applying the contact pressure. The conformity may allow a geographic model to be determined from the displacement measurements of the linear sensor arrays.

Displacement measurement devices may be configured to measure displacement linearly, rotationally, and/or along any curve or shape with any desired units of measurement. A magnetic or optical encoder may be used to measure displacement for positions where the distance to voltage curve is flat or has a very small slope, such as may occur for large joints. The processor may compute the angle between various locations of the joint based at least partially on the electrical property measurements and may account for the different displacement-angle relationships in each cavity. The processor may also reconcile the angles computed from the measurements by averaging the results or the like.

A calibration process may be used to calibrate the angle measurements; Electrical property measurements from the maximum extension, minimum extension, maximum retraction, and/or minimum retraction positions may be compared with stored maximum and minimum joint angles and/or measured maximum and minimum joint angles to calibrate electrical property measurements from the rotational hydraulic joint. The computed angles for one or more joints may allow the processor to accurately determine the position and/or location of one or more other components or items associated with the joint, such as grippers, one or more skeletal components, the limbs of the robot, hands, feet, and/or an object being gripped using trigonometry. The computed angles may allow the geometry of an object being gripped to be determined, and/or may enhance control over movements of the robot.

In large joints, the displacement measurements may require a higher degree of accuracy than can be provided by fluid measurement. An encoder may be attached to large joints to measure the displacement of the electrodes relative to one another, for example, when the distance is greater than 1 or several inches. The encoders may measure displacement for positions where the displacement to voltage relationship of the cell is flat. The measurement of electrode separation, in radial and/or linear sensor cells, may switch between measurements by opposing cells, measurements by magnetic encoders, averaging of measurements from multiple methods, or any combination thereof. A magnetic or optical encoder may be mounted to the axis of a relatively large joint. The encoder may be an AMS22U5A 1 CLARL336 rotary position sensor available from Bourns.

Any of the embodiments, materials, manufacturing techniques, usages, variations, sensors, measurement devices, calculations, processes, and/or other described attributes above may be modified by any of the embodiments, materials, manufacturing techniques, usages, and variations, sensors, measurement devices, calculations, and/or processes described in U.S. patent application Ser. No. 13/854,693 filed on Apr. 1, 2013 and/or U.S. patent application Ser. No. 13/854,710 filed on Apr. 1, 2013 attached hereto as Appendices A and B, respectively. Moreover, many of the embodiments described in Appendices A and B can utilize one or more of the embodiments of the actuator described herein, and vice versa.

Figure 7:
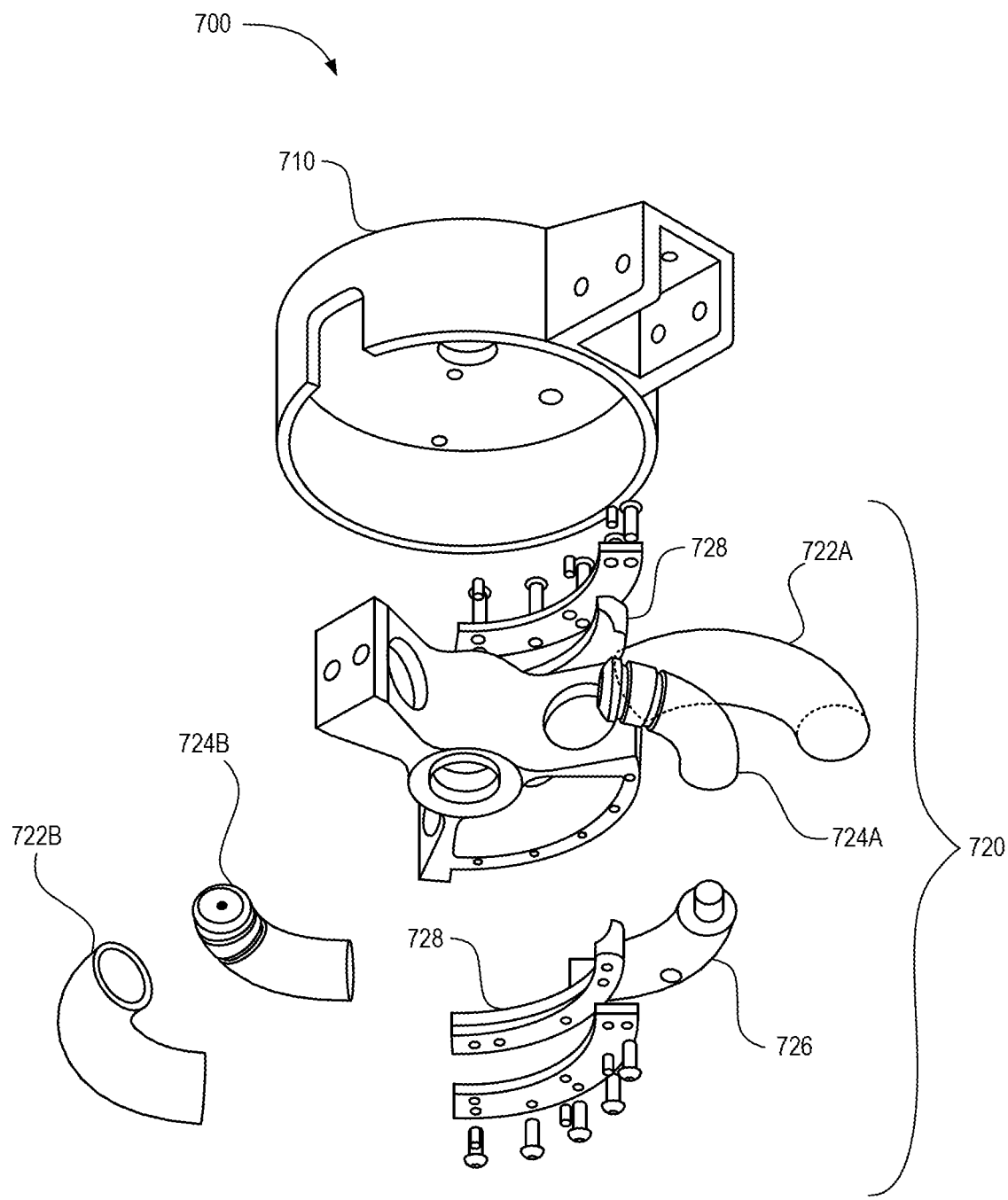
FIG. 7 is a simplified exploded view of a portion of a hydraulic joint, according to some embodiments.

FIG. 7 is a simplified exploded view of a portion 700 of a hydraulic joint (e.g., a robotic hydraulic joint), according to some embodiments. In some embodiments, a complete robotic joint will have another matching portion like the portion 700 illustrated in FIG. 7. The portion 700 includes a housing 710 and an inner actuator 720. The inner actuator 720 includes actuation cylinders 722A, 722B, pistons 724A, 724B, a piston linkage mechanism 726, and a guide mechanism 728, similar to the actuation cylinders 120, the pistons 132, the piston linkage mechanism 150, and the guide mechanism 102, respectively, of FIG. 1.

A second mirror-image inner actuator (not shown) and housing (not shown) would connect to the inner actuator 720 and housing 710 by an axle (not shown). The axle would be affixed to one side of the housing 710. The second mirror image housing is free to rotate around the axle in relation to the housing 710 with the assistance of ball bearings (not shown). Thrust bearings (not shown) are affixed between the inner actuator 720 and the second inner actuator in order to allow reduced friction during rotation. An inside of the actuation cylinders 722A, 722B may be electro-polished to create a good surface finish. To decrease the friction between the actuation cylinders 722A, 722B and seals of the pistons 724A, 724B, a Teflon coating may be added to the inside of the actuation cylinders 722A, 722B.

To reduce the cost of a robotic joint and increase the degrees of rotation, a rotating joint actuated by fluid may be made from plastic. The plastic joint may be molded from a high-strength plastic such as polyether ether ketone (PEEK), and the PEEK material may be compounded with Teflon to reduce friction. PEEK is an example of a material that is able to withstand high pressures that may be encountered while operating the portion 700 of the hydraulic joint of FIG. 7.

Figure 8:
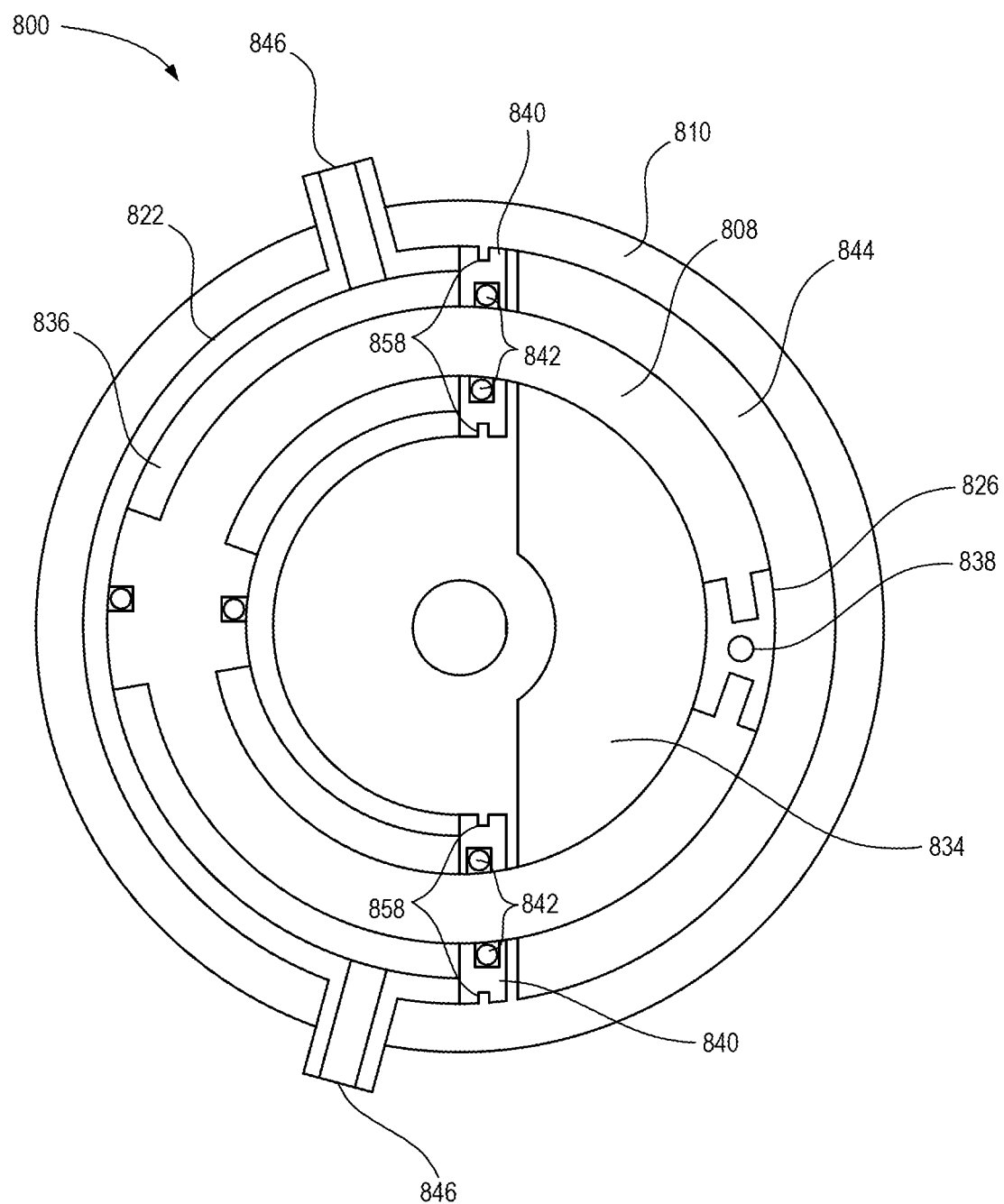
FIG. 8 is a simplified view of an example of a plastic rotating joint, according to some embodiments.

FIG. 8 is a simplified view of an example of a plastic rotating joint 800, according to some embodiments. The plastic rotating joint 800 includes a continuous toroidal piston rod 808 that extends from an extension chamber 834 into a retraction chamber (e.g., defined by a housing 810) of a toroidal cylinder 822. A linkage mechanism 826 for the piston rod 808 functions as both a piston rod connector and a drive pin to apply torque for joint actuation between the actuators or housing 810. The piston rod 808 connects to both sides of a piston. The cylinder 822 can be made from tubes of PEEK formed (e.g., thermoformed) into the shape of a torus cylinder. The piston rod 808 and piston assembly can be made from molded PEEK material. The piston's face of each chamber can be connected by a center connection piece 826 attached to each piston rod 808.

In some embodiments, the center connection piece 826 connects the actuating torus cylinder 822 to additional torus cylinders to provide more rotation or torque. In some embodiments, a connection pin 838 connect the actuator to a second half of a rotating joint, when only a single actuator inside the joint 800 is used. The connection pin 838 is perpendicular to the direction of rotation and parallel to the axis of rotation. The connection pin 838 is the applicator of the joint torque between the actuators. Accordingly, an actuator is connected to each housing 810 and the actuators are connected together by the connection pin 838.

The toroidal cylinder 822 includes end caps 840, which include piston rod seals 842 configured to prevent fluid leaking out of the cylinder 822 in order to maintain pressure. Additional seals may be added between the endcap 840 and the cylinder 822 to prevent leakage between the endcap and the housing 810. A piston rod bearing 844 external to the cylinder, made from material such as PEEK, is used to support the piston rod 808 outside of the toroidal cylinder 822. Additional bearings can be molded into the piston 808 and endcaps 840 to further support the piston rod 808 and to reduce the force on the seals 842. Adding bearings on the piston 808 and endcaps 840 on each side of a seal 842 is commonly employed to increase seal life. Here a difference may be that the piston, piston rod 808, and wear rings (e.g., rod bearing 844) are all molded together as a single unit. The external rod bearing 844 prevents bending of the piston due to side loading from rotational torque forces. The piston rod bearing 844 may be on both sides of the piston rod 808, even though the piston rod bearing 844 of FIG. 8 is only illustrated on one side of the piston rod 808.

The torus cylinder 822 includes ports 846 used for actuation, the cylinder, endcaps 840, the bearing 844, piston and piston rod 808. The actuator is molded into a containment encasement 810, which locks the endcaps 840 into position relative to the cylinder 822. The encasement 810 may not make contact with the piston rod 808 in order to eliminate friction between the encasement 810 and piston rod 808. The endcap 840 and cylinder 822 may have matching tongue and groove to keep the endcap 840 and cylinder 822 in alignment. A through-hole of the endcap 840 for receiving the piston rod 808 may match the radius of the piston rod 808 to ensure a leak-free fit. While FIG. 8 illustrates the ports 846 in the side of the cylinder 822, the ports 846 may also be through the endcaps 840 in some embodiments.

Figure 9:
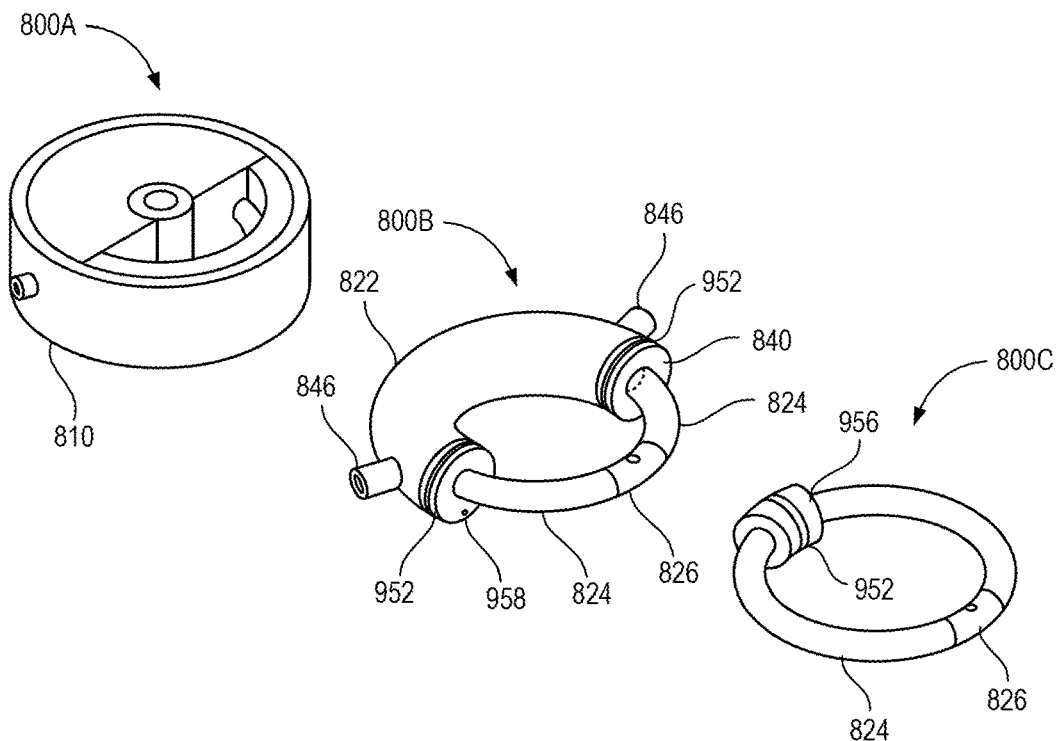
FIG. 9 illustrates a portion of the plastic rotating joint of FIG. 8 as a full assembly, as an assembly with a housing removed, and as an assembly with the housing, end caps, and o-rings removed.

FIG. 9 illustrates a portion of the plastic rotating joint 800 of FIG. 8 as a full assembly 800A, as an assembly 800B with a housing 810 removed, and as an assembly 800C with the housing 810, end caps 840, and o-rings 952 removed. In the embodiment of FIG. 9, piston 824 is a single molded piece with bearings (not shown) on both sides of a piston seal groove.

The portion 800C illustrates a piston 956 including an o-ring 952. In some embodiments, the piston seal 956 may be added after the molding before insertion into molded cylinders 822. The torus shaped cylinder 822 may include a solid rod or tube of PEEK material, which is machined to tolerance and thermoformed into the torus cylinder 822.

Once the torus cylinder 822 is shaped, the one piece molded piston 824 and piston rod 808 is inserted into the torus cylinder 822. Next, the molded endcaps 840 with inserted o-ring seals 952 are slid over the piston rod into contact with the cylinder 822. In some embodiments, the cylinder 822 may have a 15-30 degree lead in chamfer to prevent seal damage upon insertion of the piston assembly 824. A matching 15-30 degree angle on the endcap 840 presses into the 30 degree lead in chamfer of the cylinder 822. The endcap 840 may also have an alignment tongue and groove, since a hole inside the endcap 840 will have a radius that matches the radius of the piston and rod assembly 824. This alignment groove will ensure that the angle of the cylinder 822 is continued through the endcap 840 so that the piston rod 808 will experience the same radius throughout its rotation.

Once the cylinder 822, seals 952, piston 956 and rod 808, endcap 840 and rod connector are assembled, this complete actuator assembly 800B may be used as an insert for a housing 810 injection molding operation (e.g., an encasement molding). The housing 810 may be molded around the actuator 800B in order to complete the housing 810. The housing 810 is further used to maintain the endcap 840 in correct position with the torus cylinder 822. A notch 858 (FIG. 8) is provided in the endcap 840 so that the high strength plastic housing 810 may act as a pressure containment vessel to ensure the endcap 840 and cylinder 822 maintain integrity while pressurized. The Full Assembly 800B is inserted into the housing 810, similar to the assembly 720 being inserted into the housing 710 of FIG. 7.

The joint design of FIGS. 8 and 9 with molded actuator 800 functions essentially the same as the joint half 700 of FIG. 7, and the molded actuator 800 simply replaces the two-cylinder actuator 700 of FIG. 7. The molded actuator 800 of FIGS. 8 and 9 may still employ a similar axle and thrust bearings between the actuators, as illustrated in FIG. 7. The actuator 800 of FIGS. 8 and 9 may be bolted to ½ of a joint cover/housing. In this configuration, the actuation causes the joint to rotate 800. An advantage of the molded design of FIGS. 8 and 9 is that rotation is increased to 160 degrees in comparison to 90 degrees of rotation afforded by the actuator 700 of FIG. 7.

Figure 10:
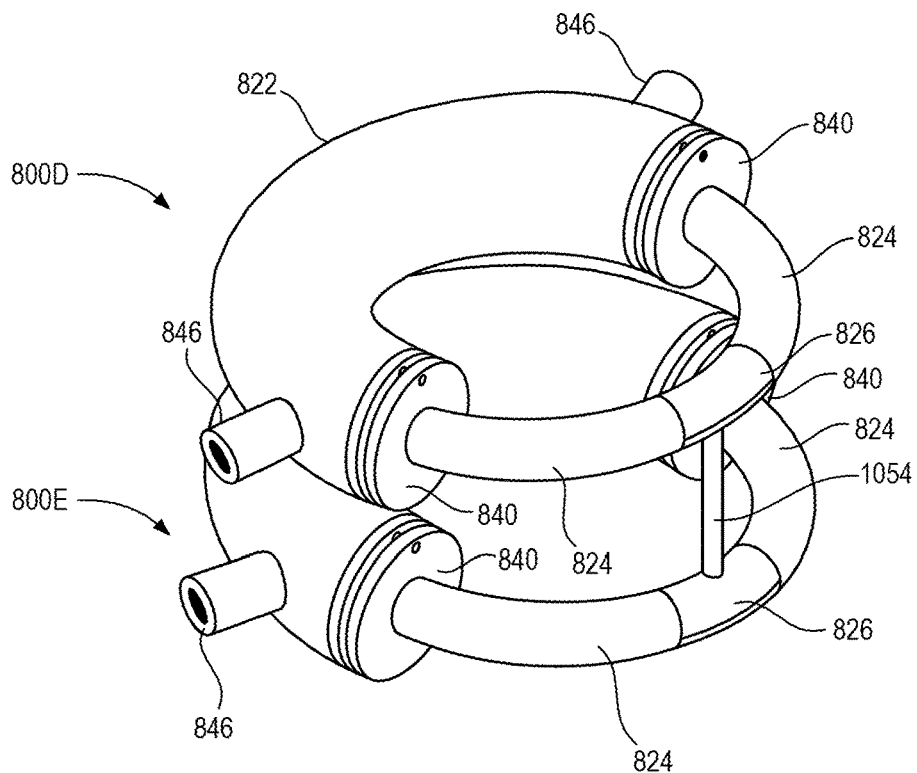
FIG. 10 is a simplified perspective view of a pair of molded actuators, according to some embodiments.

FIG. 10 is a simplified perspective view of a pair of molded actuators 800D, 800E, according to some embodiments. Each one of the molded actuators 800D, 800E includes a joint half similar to those 800, 800A, 800B, 800C of FIGS. 8 and 9, and without showing housings 810 (FIGS. 8 and 9) for simplicity. FIG. 10 illustrates piston connectors 826 of the actuators 800D, 800E. A drive pin 1054 operably couples the piston connectors 826 of the actuators 800D, 800E together. Each side of the piston 824 is connected together by the piston connectors 826. The piston connectors 826 are connection mechanisms, via the drive pin 1054, for the actuators 800D, 800E.

An actuation force is applied from one of the joint halves 800D, 800E to the other of the joint halves 800D, 800E by the drive pin 1054, which is attached to the piston connectors 826. To ensure that the cylinder 822 and piston 824 operate properly throughout a broad temperature range, a coefficient of thermal expansion must be similar for both the piston rod 810 (FIG. 8) and cylinder 822. One way to ensure uniform thermal expansion of components is to use the same material for as many components of the actuators 800D, 800E as possible.

In some embodiments, disclosed is a hydraulic actuator for producing rotational motion. The hydraulic actuator includes a piston rod and a piston, the piston rod attached to both sides of the piston such that the piston rod extends from a piston extension chamber into a piston retraction chamber.

The piston rod is attached to both sides of the piston. Together, the attached piston and piston rod are a continuous uninterrupted torus.

In some embodiments, disclosed is a hydraulic actuator for producing rotary motion including a torus shaped cylinder. The torus shaped cylinder includes a fluid port on each end of the torus cylinder. In some embodiments, the fluid port is in an endcap on each end of the torus cylinder.

In some embodiments, the torus cylinder enables 180 degrees of rotation or less. The piston rotates from one end of the torus shaped cylinder to the other end of the torus shaped cylinder.

In some embodiments, The torus shaped cylinder is molded from an engineering plastic. In some embodiments, this engineering plastic includes a PEEK composite.

In some embodiments, a piston, piston rod, and wear ring are molded into a single piece. In some embodiments, piston seals are the only externally added component of the piston and rod assembly.

In some embodiments, disclosed is a one-piece molded torus shaped piston and piston rod assembly. In some embodiments, the ends of the piston rod are connected together by a linkage mechanism to create a continuous torus assembly.

In some embodiments, the piston and piston rod are a molded thermoplastic of the same material as the cylinder. In some embodiments, the molded piston and piston rod include a PEEK composite.

In some embodiments, an end cap is inserted onto the piston rod and attached to the torus shaped cylinder. In some embodiments, the endcap has a through hole that has a radius that is about the same as a radius of the toroidal piston rod.

In some embodiments, the cylinder includes a groove that matches a slot in the endcap for assembly to maintain alignment of the endcap in relation to the cylinder and piston.

In some embodiments, the actuators are inset molded into an outer housing containing the torus cylinder and endcap. A through port is molded through the housing to the port of each end of the torus shaped cylinder.

In some embodiments, the endcap includes a groove on the outside thereof into which flows a material forming an outer housing, and which permanently affixes the endcap to the cylinder and housing. In some embodiments, the endcap may not be disassembled from and reassembled to the cylinder.

In some embodiments, disclosed is a hydraulic toroidal actuator that is attached to half of a housing of a hydraulic joint, and another hydraulic toroidal actuator is attached to another half housing of the hydraulic joint.

In some embodiments, a pin may connect the actuator to a second housing half (with approximately 160 degrees rotation) if only one actuator is used.

In some embodiments, a linkage mechanism connects one actuator to a second actuator inside a hydraulic joint. In some embodiments, the linkage mechanism also secures each end of the toroidal piston rod together. In some embodiments, the hydraulic actuators can be stacked in parallel/series to increase the degrees of rotation or the torque of a hydraulic joint. These actuators are connected together by additional linkage mechanisms.

In some embodiments, a plastic torus cylinder and endcap molded into a support housing encase both the cylinder and endcap in a permanent assembly.

Figure 11A:
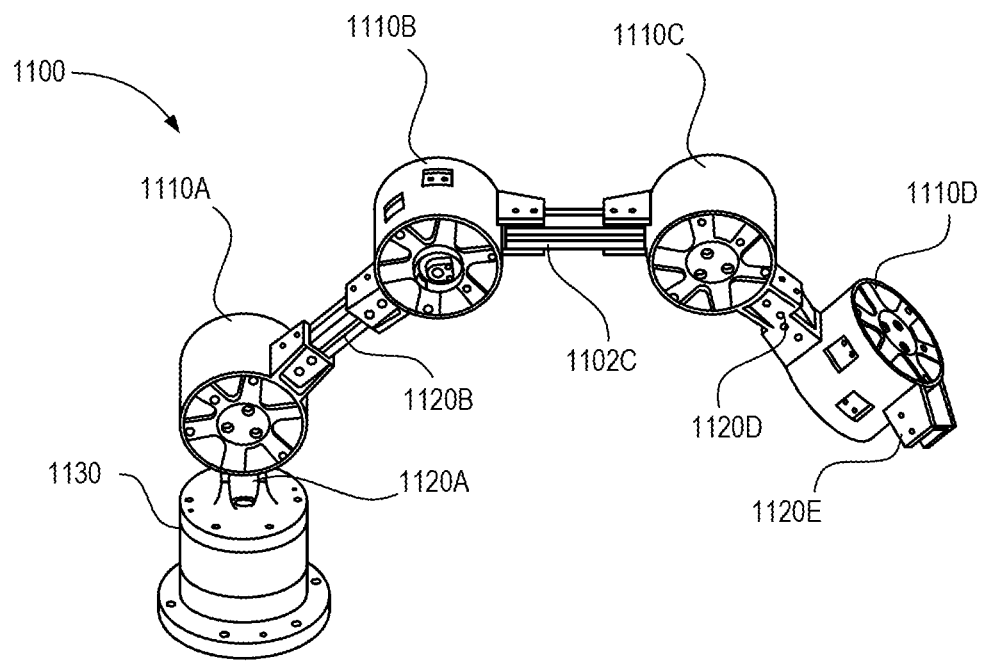
FIGS. 11A and 11B illustrate views of a robotic arm, according to some embodiments.
Figure 11B:
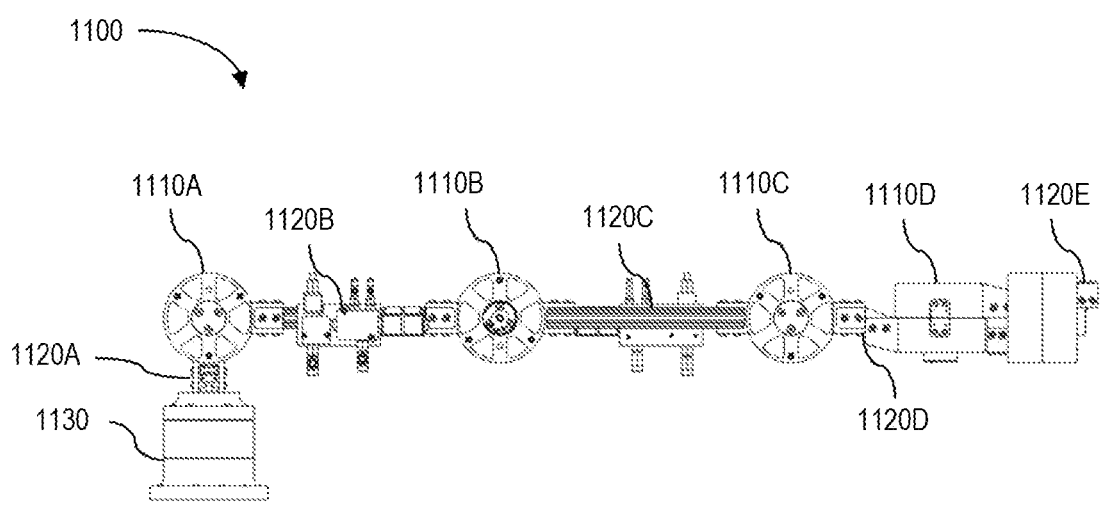

In some embodiments, Rotational joints with the actuators 700, 800 of FIG. 7 or 9 can be utilized in robotic arms and hands. FIGS. 11A and 11B illustrate views of a robotic arm 1100, according to some embodiments. The robotic arm 1100 includes a stationary base and horizontal rotary joint 1130, joints 1110A, 1110B, 1110C, and 1110D (sometimes referred to herein simply together as "joints" 1110 and separately as "joint" 1110), and links 1120A, 1120B, 1120C, 1120D, and 1120E (sometimes referred to herein simply together as "links" 1120 and separately as "links" 1120). Each of the joints 1110 includes a pair of actuators (e.g., the actuators 700 and/or the actuators 800 of FIGS. 7 and/or 8, respectively). The actuators of each joint 1110 may, in some embodiments, be operably coupled together using a drive pin 1054, as illustrated in FIG. 10.

The joints 1110 are coupled between the links 1120. For example, link 1120A, which is connected to the stationary base 1130, is connected to the link 1120B by joint 1110A. Also, link 1120B is connected to link 1120C by joint 1110B. Further, link 1120C is connected to link 1120D by joint 1110C. Further, link 1120D is connected to link 1120E by joint 1110D.

One half (i.e., one of the actuators 700, 800) of each joint 1110 is coupled to one link 1120, and another half of the same joint coupled to another link 1120. In this way, actuation of the joint 1110 causes rotation of the robotic joints 1110 and links 1120. For example, half of joint 1110A is connected to link 1120A, which is attached to the stationary base and horizontal actuator 1130. The other half of joint 1110A is connected to link 1120B. When the joint 1110A is actuated, an angle of the link 1120B with respect to the link 1120A will change. The same will occur upon actuation of the other joints 1110B, 1110B, 1110C, and 1110D, affording a large degree of multi-joint maneuverability of the structure of the robotic arm 1100.

Figure 12:
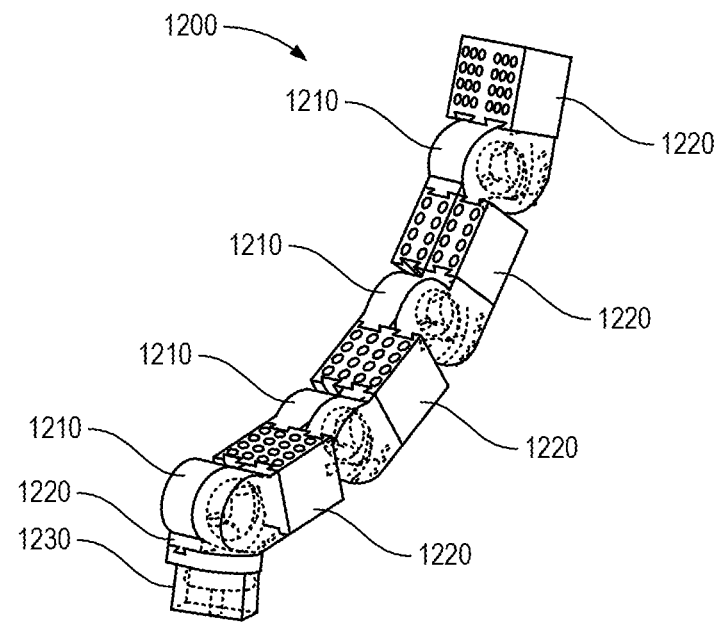
FIG. 12 is a simplified perspective view of a robotic finger, according to some embodiments.

FIG. 12 is a simplified perspective view of a robotic finger 1200, according to some embodiments. The robotic finger 1200 includes a stationary base 1230, links 1220, and joints 1210, similar to the stationary base 1130, links 1120, and joints 1110, respectively, as discussed with reference to FIG. 11. The robotic finger 1200 of FIG. 12 includes four joints 1210. It should be understood, however, that in some embodiments, the robotic finger 1200 may employ other numbers of joints 1210, depending on a desired maneuverability of the robotic finger 1200. By way of non-limiting example, the robotic finger 1200 may include only a single actuator and still attain 90 or 170 degrees rotation (corresponding to actuators 700, 800 respectively of FIGS. 7 and 8), depending on the internal actuator used or additional actuators for each joint may be used to increase the degrees of rotation or torque.

In some embodiments, disclosed is a robotic joint including a toroidal hydraulic actuator connected to a housing. A first half of the housing is connected to a single actuator, and a second half of the housing is connected to a second actuator.

In some embodiments, however, only a single actuator is used. In some such embodiments, the second half of the robotic housing is connected to an actuator of the first half of the housing by a drive pin.

In some embodiments, a robotic joint includes multiple stacks of actuators inside a robotic joint housing. In some such embodiments, each additional actuator is connected to an actuator connected to a first housing by additional drive pins. The additional actuators are also connected to a second housing actuator by a drive pin.

In some embodiments, a first joint housing actuator is connected to a first actuator and a second joint housing is connected to a second actuator. In some such embodiments, additional actuators are connected to a first housing actuator and second housing actuator by additional drive pins.

In some embodiments, disclosed is a hydraulic robotic arm. Valves for robotic joint actuation are located on the arm. The valves are located on links between the joints.

In some embodiments, a hydraulic circuit (e.g., the full hydraulic circuit) is mounted on a robotic arm. In some such embodiments, a power unit (e.g., a power supply) for the hydraulic circuit may be mounted off the robotic arm.

Figure 13A:
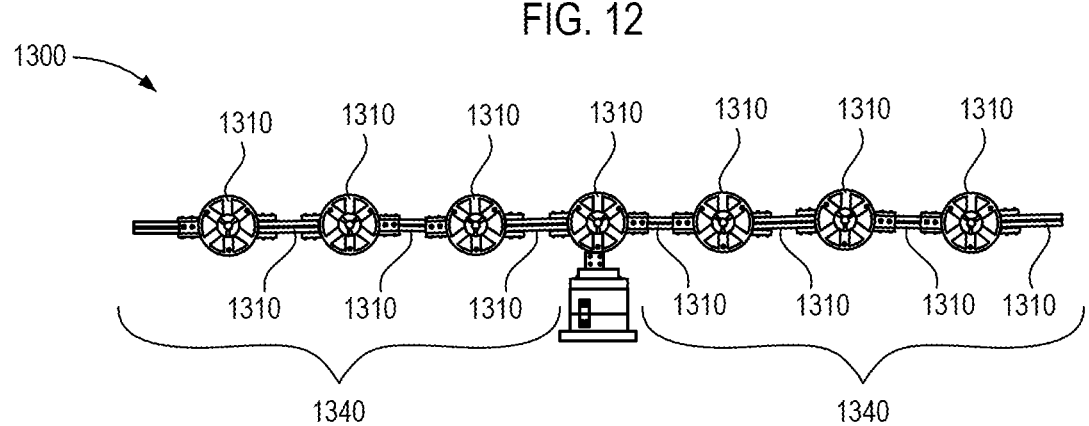
FIGS. 13A and 13B are simplified side views of a robotic hand in a fully extended position and in a flexed position, respectively, according to some embodiments.
Figure 13B:
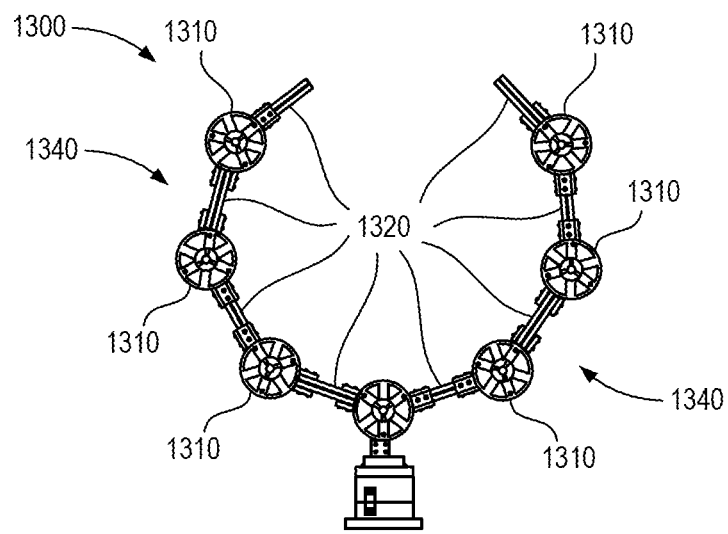

FIGS. 13A and 13B are simplified side views of a robotic hand 1300 in a fully extended position and in a flexed position, respectively, according to some embodiments. The robotic hand 1300 includes robotic arms 1340 stacked in parallel to create robotic grippers. Each of the robotic arms 1340 includes at least one joint 1310 coupled between links 1320, similar to the joints 1110 and links 1120 discussed above with reference to FIG. 11. While conventional robotic arms do not typically function as a gripper, as illustrated in FIG. 13, the power to weight ratio of the actuators 700, 800 of FIGS. 7 and 9, which the joints 1310 include, enables the robotic arms 1340 to function as both alone as an arm or together as a hand (i.e., the robotic hand 1300).

In some embodiments, each of the joints 1310 may include the same diameter of torus shaped cylinder 722, 822 (FIG. 7, FIG. 8) for the internal actuators 700, 800 (FIG. 7, FIG. 8). Accordingly, uniform actuation of the joints 1310 would result in a uniform pressure applied to an object being grasped by the robotic hand 1300, assuming that the links 1320 are about the same length.

In some embodiments, different volume cylinders 722, 822 (FIG. 7, FIG. 8) may be used in the various joints 1310 of the robotic hand 1300. For example, where two or more robotic arms 1340 function as a robotic hand 1300, a larger robotic arm 1340 may allow actuation of the robotic arms 1340 as a robotic hand 1300. In some embodiments, each of the robotic arms 1340 of the robotic hand 1300 may have its own robotic hand at the end thereof (not shown). As a result, in some embodiments, the robotic hand 1300 may include robotic arms 1340, each having its own robotic hand, and robotic arms of these hands function as hands of a larger robotic arm 1340. Accordingly, there may be three robotic arms and three robotic hands in a single robot. These robotic arms as hands may use only three of the joints 1310 for a gripping and the other joints 1310 may control another gripping system.

Referring now to FIGS. 11A, 11B, 12, and 13 together, fluid of the robotic arms 1100, 1340, fingers 1200, joints 1110, 1210, 1310, and hands 1300 may be contained in an encapsulation structure. The encapsulation structure starts at the inside of the joints 1110, 1210, 1310. A lip seal around the joints 1110, 1210, 1310 seals fluid from escaping the robotic joints 1110, 1210, 1310. The fluid is further funneled into the area of the joints 1110, 1210, 1310 where the ports (e.g., ports 846 of FIG. 8) are connected to the joints 1110, 1210, 1310. The fluid is then run through an additional fluid leakage port and hose back to the fluid reservoir. The result is three hoses to the joint 1110, 1210, 1310; a hose to the joint 1110, 1210, 1310 from a pump line of the valve, a hose from the joint 1110, 1210, 1310 to the reservoir line of the valve, and a separate hose for the fluid leakage containment system. The hose from the valve to the reservoir and the hose to the reservoir from the fluid containment system may join into a single line to the reservoir past the flow valve of the meter out speed controller of each joint 1110, 1210, 1310. Accordingly, only two hoses from the hydraulic power unit to each joint 1110, 1210, 1310 of the arm 1100, 1340 may be sufficient. Alternatively, the fluid containment hose may connect with other fluid containment hoses from other joints 1110, 1210, 1310, which may all channel to the fluid reservoir directly.

In some embodiments, disclosed is a robotic arm including a hand on the end of the robotic arm. In some embodiments, the robotic arm functions as the fingers of another (e.g., larger) robotic arm. In some embodiments, the robotic arm functions independent of other robotic arms. In some embodiments, the robotic arm functions together with other robotic arms as a single robotic hand.

Figure 14:
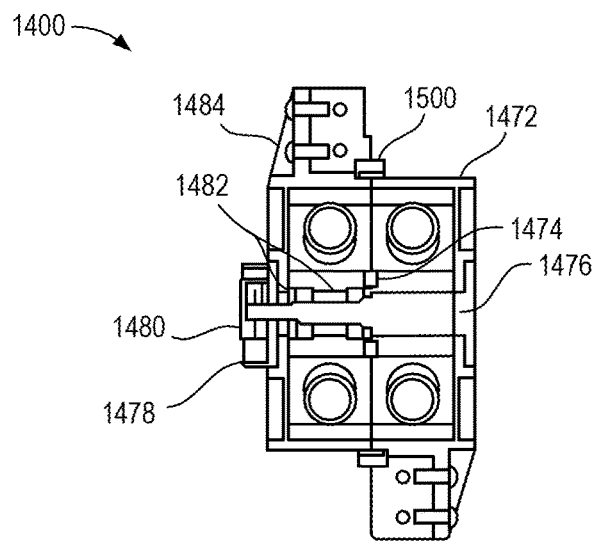
FIG. 14 is a fluid containment system, according to some embodiments.

FIG. 14 is a fluid containment system 1400, according to some embodiments. The fluid containment system 1400 may be employed to prevent fluid from leaking out of a robotic joint 1110, 1210, 1310 (FIGS. 11, 12, and 13), which may occur from leaking seals inside a hydraulic cylinder. Additional benefits of a sealed hydraulic joint is the reduction or elimination of contaminates entering the cylinders, which creates a failure mode for hydraulics.

The fluid containment system 1400 includes a first joint shell 1472, a second joint shell 1484, thrust bearings 1474, a joint axle/shaft 1476, an encoder 1480, an encoder guard 1478, ball bearings 1482, and a lip seal assembly 1500. The lip seal assembly 1500 keeps the fluid contained inside the robotic joint 1110, 1210, 1310. A port (not shown) is connected to the housing of the robotic joint 1110, 1210, 1310. This port will receive all leaked fluid inside the joint and allow the leaked fluid to flow to the reservoir. Further, all the port fittings may be contained in a housing so that any fitting leakage is also funneled into the fluid containment hose port. In this manner, little to no fluid leakage will leave the contained robot environment. In some embodiments, halves of housing/shells 1484 and 1472 may be sealed. The drive pin between the actuators would have a seal as it is the only component that is mechanically rotating between the half shells/housings. The drive pin may have a permanent seal that rotates through a seal housing (not shown).

Figures 15A, 15B:
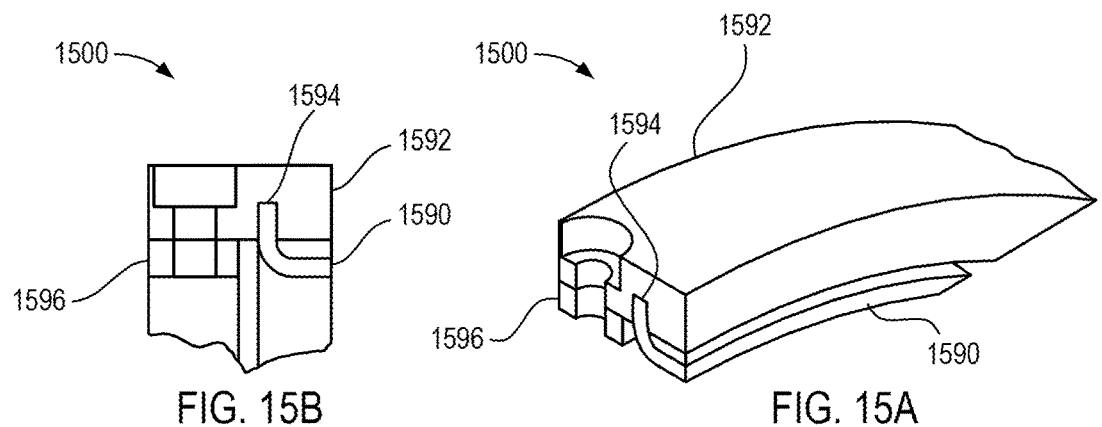
FIGS. 15A-15D illustrate different views of the lip seal assembly of the fluid containment system of FIG. 14.
Figures 15C, 15D:
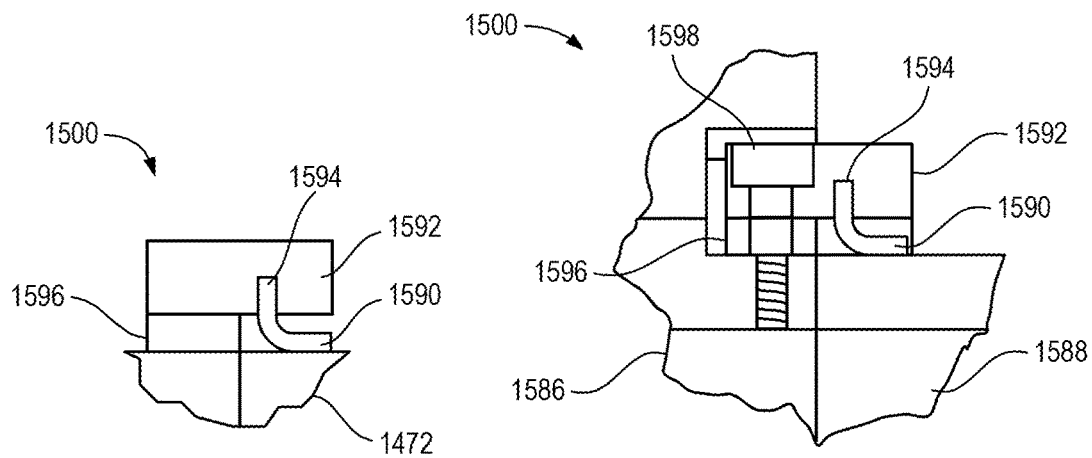

FIGS. 15A-15D illustrate different views of the lip seal assembly 1500 of the fluid containment system 1400 of FIG. 14. FIG. 15A is a perspective view of the lip seal assembly 1500. FIGS. 15B-15D are different cross-sectional views of the lip seal assembly 1500. The lip seal assembly 1500 includes a rigid (e.g., aluminum) band 1592 defining a groove 1594 therein. The lip seal assembly 1500 also includes a lip seal 1590 inserted into the groove 1594 of the rigid band 1592. In some embodiments, the lip seal 1590 may be bent at about a 90° angle, as illustrated in FIGS. 15A-15D.

In some embodiments, the lip seal 1590 may include a rubber-type material designed to seal leaked fluid inside the hydraulic joint. The complete lip seal assembly 1500 of FIGS. 15A-15D is affixed to the second joint shell 1484 of FIG. 14. The 90° bent lip seal 1590 is free to slide relative to the rotation of the first joint shell 1472 of FIG. 14. In this manner, the fluid is sealed within the joint.

As illustrated in FIG. 15C, the lip seal assembly 1500 also includes a stationary seal 1596 inside a first joint half 1586. The stationary seal 1596 is stationary and may be attached by cap screws 1598. The lip seal 1590 of second joint half 1588 is held in place by the rigid band 1592, within the groove 1594. The lip seal 1590 remains stationary with reference to the first joint half 1586, and the second joint half 1588 rotates along the lip seal 1590 to entrap all fluid leakage inside the joint.

In some embodiments, disclosed is a hydraulic joint providing rotational motion, the hydraulic joint including a fluid sealing mechanism. The fluid sealing mechanism isolates fluid leakage from an actuator inside the joint.

In some embodiments, a fluid sealing mechanism includes a port to transfer fluid out of the joint to a fluid reservoir. In some such embodiments, the port includes a sealed housing that includes ports (e.g., all ports) for joint actuation. A fluid containment port has fittings attached to the port containment housing.

The port to transport leaked fluid out of the joint is connected to a fluid reservoir.

In some embodiments, a hydraulic robotic joint is sealed to prevent internal joint leakage from escaping a robot including the robotic joint. The robot includes a fluid leakage line ported from the joint. A fluid leakage port connects to a common tank line from robotic joints after the meter out flow control valve, so that a pressure of a fluid containment hose is the same as a reservoir pressure.

In some embodiments, a fluid leakage port includes an isolated hose that transports the fluid directly to the fluid reservoir. In some embodiments, multiple hydraulic joints may be connected to the isolated fluid reservoir hose.

In some embodiments, the fluid sealing mechanism includes a lip seal between actuator half sections. In some embodiments, each actuator half section of a robotic joint is sealed individually.

In some embodiments, a joint half section includes a rubber seal that extends from a first joint half to a second joint half. A joint of the second joint half rotates inside the rubber seal to contain fluid leakage. The rubber seal may is stationary and affixed to the first joint half.

Figure 16A:
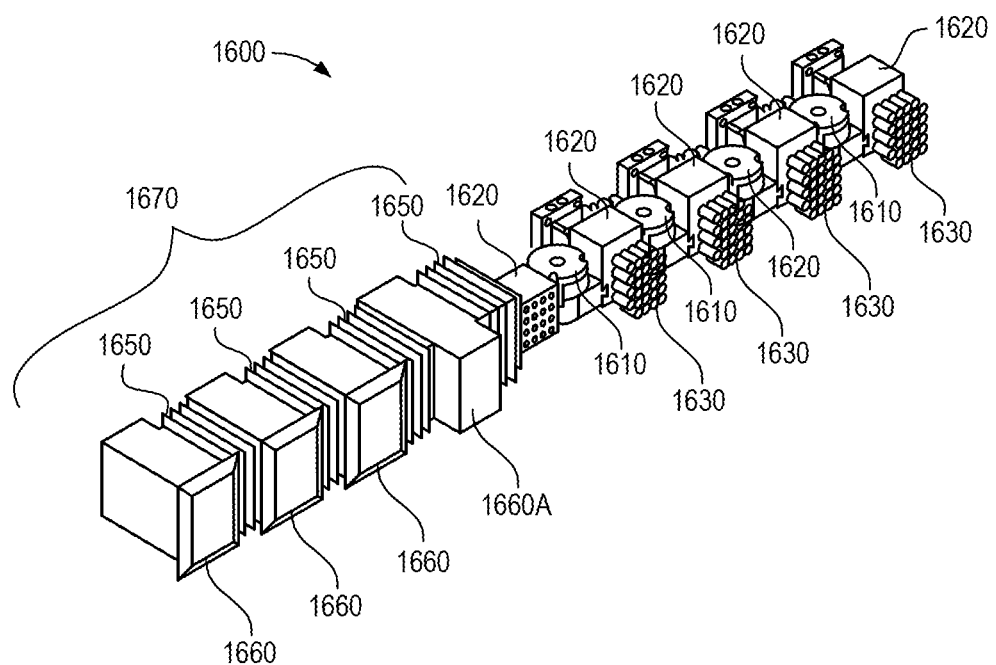
FIGS. 16A and 16B are simplified perspective views of a robotic hand, according to some embodiments.
Figure 16B:
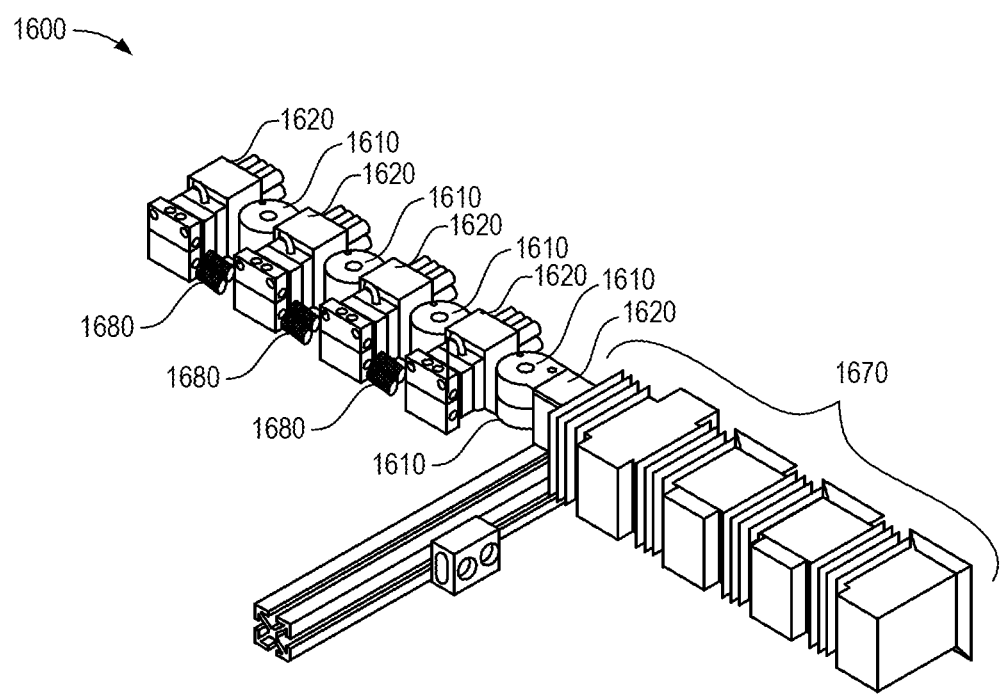

FIGS. 16A and 16B are simplified perspective views of a robotic hand 1600, according to some embodiments. The hand fluid containment system includes a string of joints 1610 and links 1620, similar to the joints 1110, 1210, 1310 and links 1120, 1220, 1320 of FIGS. 11, 12, and 13. As illustrated in FIG. 16A, the links 1620 include sensor pistons 1630 configured to extend from the links 1620. Also, as illustrated in FIG. 16B, the links 1620 include PEEK coiled tubing 1680 thereon.

The system 1600 also includes a robotic skin 1670 covering at least a portion of the string of joints 1610 and links 1620. The robotic skin 1670 is designed to contain leakage of hydraulic fluid, enclose hydraulic components of a robotic arm and/or robotic hand (e.g., all the components of the robotic arm and robotic hand), and cushion impact of the robotic arm and/or the robotic hand with objects and people. The robotic skin 1670 may include a soft resilient material, such as silicon or rubber. The robotic skin 1670 is also designed to function as a fluid transport system to contain any leakage of hydraulic fluid.

The robotic skin 1670 includes joint bellows 1650 configured to accommodate for rotation of the joints 1610. The robotic skin 1670 also includes sensor piston bellows 1660 configured to accommodate for extending and retracting of the sensor pistons 1630. For example, sensor piston bellows 1660A is illustrated in a flexed position, and the other sensor piston bellows 1660 are illustrated in an un-flexed position.

In some embodiments, disclosed is a robot skin for a robot. The robot skin includes hydraulic fluid of the robot. The robot skin is sealed with a connection to a hydraulic fluid reservoir. Leaked fluid is transported to the hydraulic fluid reservoir inside the robotic skin.

In some embodiments, the robot skin includes a port to connect to the hydraulic fluid reservoir for fluid leakage.

In some embodiments, the robot skin encases hydraulic hoses, electrical circuits, hydraulic circuits, sensors and wires (e.g., all the hydraulic hoses, electrical circuits, hydraulic circuits, sensors, and wires).

In some embodiments, the robot skin applies a pressure on a robotic arm and/or hand covered thereby in order to force fluid to the hydraulic fluid reservoir.

Figure 17:
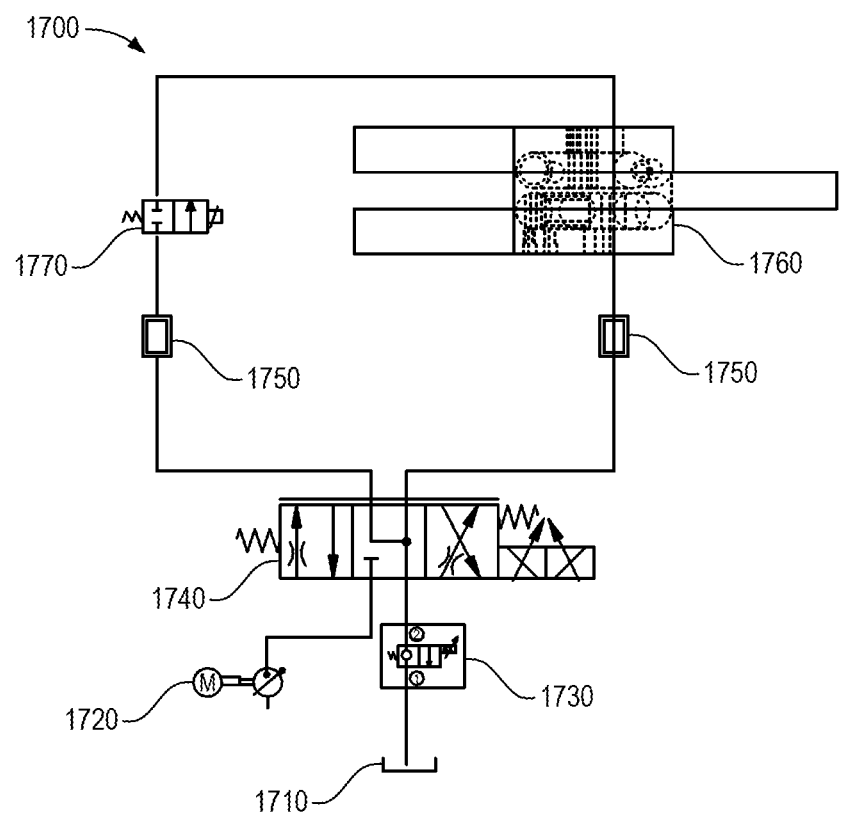
FIG. 17 is a simplified hydraulic circuit diagram of a hydraulic control circuit of a robot hand and/or a robotic arm, according to some embodiments.

FIG. 17 is a simplified hydraulic circuit diagram 1700 of a hydraulic control circuit of a robot hand and/or a robotic arm, according to some embodiments. The hydraulic circuit 1700 is configured to allow manual teaching of a robot. During a teach mode, a float center valve 1740 is moved to a center position, a flow control valve 1730 (e.g., an electro-proportional flow control valve) is closed, and a two-way valve 1770 is open. In this state, fluid channels of rotating actuators 1760 (e.g., actuators 700, 800 of FIGS. 7 and 8) are connected together so that there is little or no pressure difference between the rotating actuators 1760 of a hydraulic joint.

The flow control valve 1730 may be opened to lower the pressure in the actuators 1760 to a desired pressure for manual manipulation or a pressure to the arm may be controlled by controlling pump pressure to the arm for lift assist, when a direction of manual teaching is known. The pressure in the actuators 1760 may be monitored by pressure transducers 1750, or the like. The float center valve 1740 is shifted to the center position so that a person can manually move the robotic arm, but the direction valve 1740 may be dithered between a direction and center position for lift assist active control. In a manual teach mode operation, the two way valve 1770 is set in the open position to allow flow through the two way valve 1770. A force/torque sensor (not shown) can measure the force that a human pushing on a robotic joint exerts. With the use of force/torque sensors (not shown), a robot control program (e.g., implemented on a processor operably coupled to a computer-readable storage medium including computer-readable instructions stored thereon, the computer-readable instructions configured to instruct the processor to perform functions of the robot control program) may perform lift assist in order to make the robotic arm easier to manipulate for the teach mode operation. The force/torque sensor makes possible the use of active control for lift assist of the robotic arm for manual teaching by a human operator. An electro proportional pressure control on a variable displacement pump may be used to set the pressure to compensate and cancel the torque applied to a robotic joint/arm/hand from gravity. The gravity canceling through hydraulic pressure control enables gravity free manual manipulation. Regulating the flow control valve of each joint and dithering the directional valve can accomplish additional pressure control. The pressure is set to exactly balance the arm with respect to weight of the arm and payload.

Figure 18:
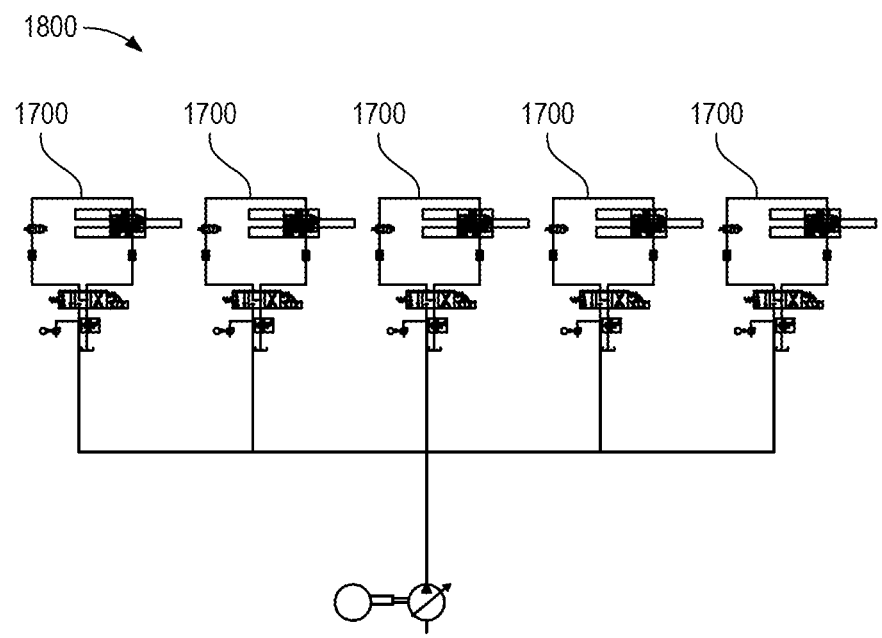
FIG. 18 is a simplified circuit diagram of a hydraulic control circuit, according to some embodiments.

FIG. 18 is a simplified circuit diagram of a hydraulic control circuit 1800, according to some embodiments. The simplified hydraulic circuit 1800 includes five hydraulic control circuits 1700, as discussed with reference to FIG. 17, for a teach mode robot. Each of the hydraulic control circuits 1700 may be configured to control a different joint of a robotic arm and/or hand.

Figure 19:
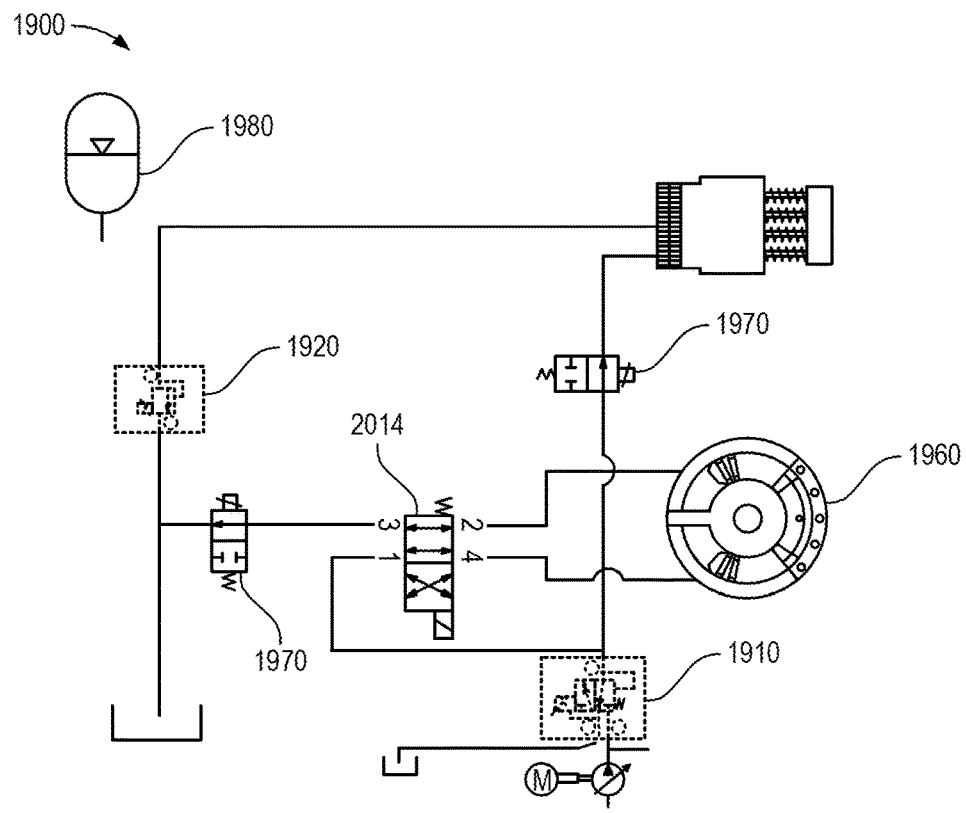
FIG. 19 is a simplified hydraulic circuit diagram of a hydraulic control circuit for a robotic hand, according to some embodiments.

FIG. 19 is a simplified hydraulic circuit diagram of a hydraulic control circuit 1900 for a robotic hand, according to some embodiments. The robotic hand includes a rotating actuator 1960. A hydraulic circuit branch controls the fluid in the linear electrochemical sensor and another branch controls the finger joints. The pressure in the linear sensors is controlled by a pressure reducing valve 1910 and a pressure relief valve 1920. In some embodiments, the pressure to the hand may be reduced from pump pressure by a single pressure reducing valve 1910. The linear sensors may require a lower pressure or a variable pressure, which is different than the pressure in the robotic joints. This is because a specified gripping force may be used in the robotic joints, and the pressure may be specified lower in the sensors so that the sensors may conform to the shape of an object being gripped.

In the example illustrated in FIG. 19, a two-way valve 1970 may be energized in such a way as to stop flow to the sensors. Then, the pressure may be lowered in the sensor by setting the pressure relief valve 1920 to the desired pressure of the linear electrochemical displacement sensors. This variable pressure control will ensure the sensors conform to the object and apply the exact desired pressure to the object. An accumulator 1980 may be connected directly to the hydraulic linear displacement sensor modules instead of pressure supplied from the pump. The accumulator bladder in the circuit 1900 acts as a spring to allow the sensors to conform to the shape of an object, and the pressure in the accumulator 1980 is used to apply pressure to an object through the sensor module.

Figure 20:
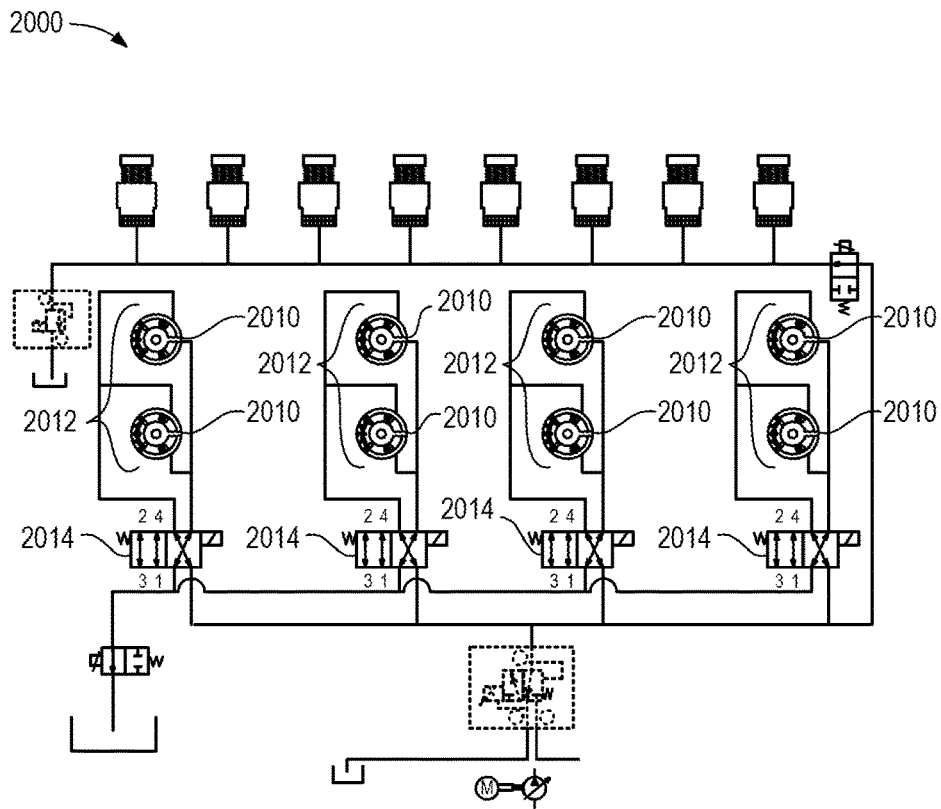
FIG. 20 is a simplified hydraulic circuit for a two-finger robotic hand with one sensor module between each of the four joints per finger, according to some embodiments.

FIG. 20 is a simplified hydraulic circuit 2000 for a two-finger robotic hand with one sensor module between each of the four joints per finger, according to some embodiments. Finger joints 2010 of the robotic hand are connected in pairs 2012 so that a one-directional valve 2014 controls the set 2012 of equivalent joints 2010 of each finger of the robotic hand. A first directional valve 2014 controls a first set 2012 of joints 2010 for each finger. A second directional valve 2014 controls a second set 2012 of joints 2014 from each finger, and so on. As a result, each pair 2012 of joints 2010 of the circuit 2000 includes a separate one-directional valve 2014. FIG. 20 illustrates the simultaneous control of a joint of each finger for more than one finger. In some embodiments, more than one actuator may be used to increase the degrees of rotation or torque, and these would be added with fittings and porting with no additional valves.

A pressure transducer (not shown) can be inserted in the linear electrochemical sensor hydraulic hose line and/or the hydraulic joint hose line to evaluate and control pressure. FIG. 16 illustrates one embodiment of a hydraulic joint pair configuration. Pressure compensated flow control valves may be employed to ensure that each joint of the finger pair move at the same speed.

Figure 21:
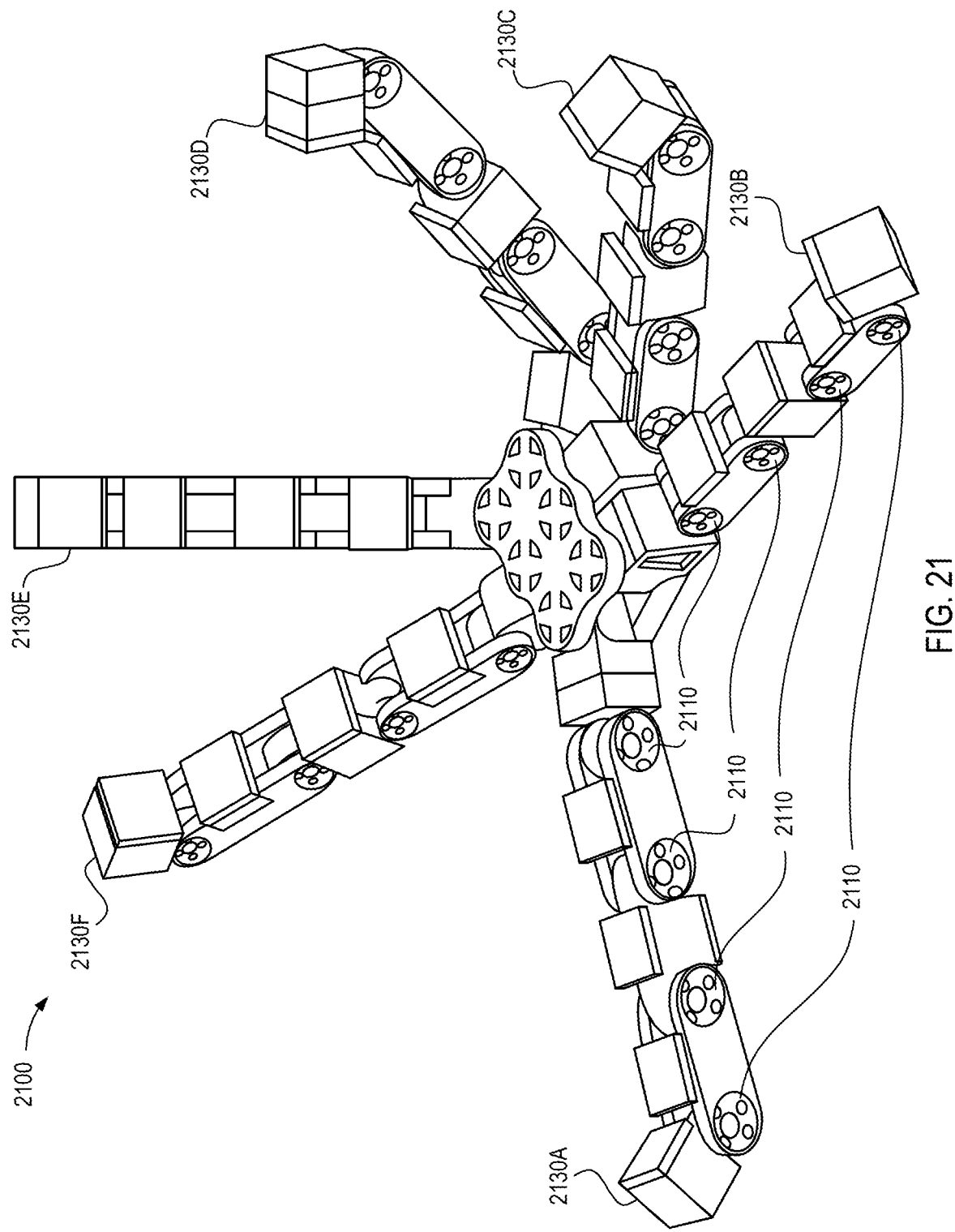
FIG. 21 is a simplified perspective view of a six-fingered robotic hand, according to some embodiments.

FIG. 21 is a simplified perspective view of a six-fingered robotic hand 2100, according to some embodiments. The six-fingered robotic hand may operate such that a first two fingers 2130A, 2130B have individual joint control or joint control in pairs 2012 (i.e., 2012A, 2012B, 2012C, 2012D). The remaining four fingers 2130C, 2130D, 2130E, and 2130F may have individual or pair 2012 control of the joints 2110. However, often only grasping is needed for the remaining fingers 2130, and therefore the remaining fingers 2130 may all open and close with a single directional valve 2014 per finger 2130.

Figure 22:
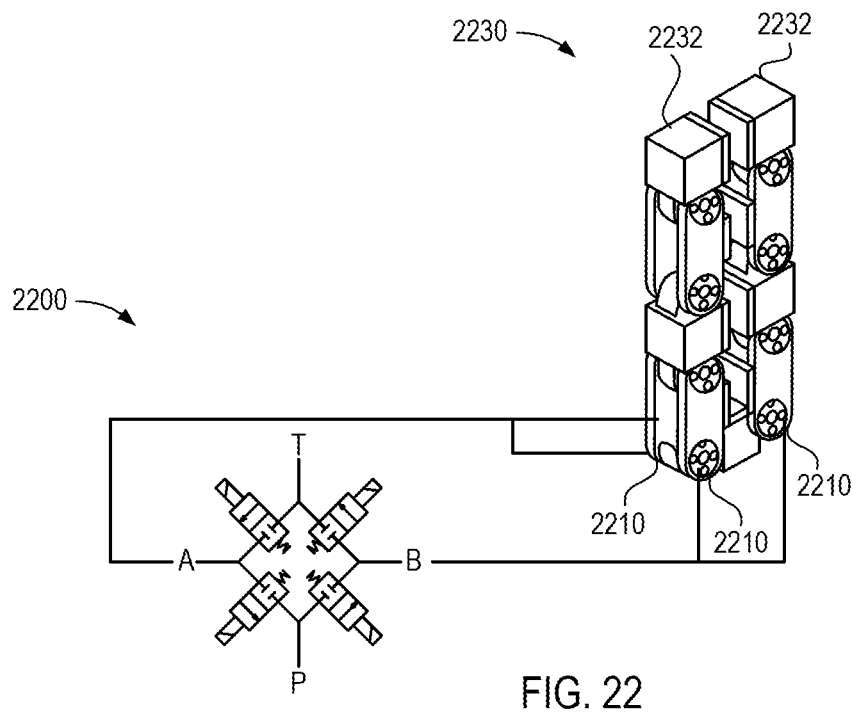
FIG. 22 is a simplified circuit diagram of another embodiment of a hydraulic circuit to operate joints of a robotic hand, according to some embodiments.

FIG. 22 is a simplified circuit diagram of another embodiment of a hydraulic circuit 2200 to operate joints 2210 of a robotic hand 2230, according to some embodiments. The hydraulic circuit 2200 may be used to control a single joint 2210, a joint pair, a robotic finger 2232 of the robotic hand 2230, or multiple robotic fingers 2232 of the robotic hand 2230.

In some embodiments, disclosed is a hydraulic circuit for a robotic arm. The hydraulic circuit is designed to allow manual teaching of the robotic arm by moving the robot manually and recording the movements for playback.

In some embodiments, for teach mode operation, a meter out flow control valve to tank is closed, a pump line to a joint is closed, a two-way valve between actuators of the joint is opened to enable flow between extension and retraction chambers of a hydraulic actuator of the joint. These valve positions are set during a teach mode command.

In some embodiments, hydraulic robotic joints are moved manually and the movements are recorded for playback.

In some embodiments, active control of a hydraulic joint is implemented during a teach mode operation to assist the manual operation.

In some embodiments, active control in the teach mode operation will work to cancel the forces of gravity, payload, and hydraulic stiffness by switching the valve in response to force torque sensors to zero the torques of the robotic arm.

In some embodiments, a pressure transducer measures pressure in a hydraulic robotic joint, and a flow control valve is opened to lower the pressure in the joint to make the joint easier to move.

In some embodiments, a force/torque sensor zeroes forces (e.g., all forces) on the robotic arm through directional and flow control valves except the force applied by a human to manually move the robotic arm.

In some embodiments, disclosed is a hydraulic circuit for a robotic gripper including hydraulic linear displacement sensors. In some embodiments, hydraulic rotary joints and the hydraulic linear displacement sensors are pressurized from a same hose from a pump. In some such embodiments, the hydraulic circuit is connected to a hydraulic circuit of a hydraulic robotic arm. The hydraulic circuit operates at a lower pressure than a hydraulic arm circuit. A pressure reducing valve lowers the pressure to the hydraulic circuit for the robotic gripper. In some embodiments, a pressure relief valve is connected between a tank and a supply line of the hydraulic linear displacement sensors. The pressure of the hydraulic linear displacement sensors is set by the pressure relief valve, which may be different than the pressure of the joints or of the gripper.

In some embodiments, a two-way valve is added to a hydraulic circuit of the hydraulic linear displacement sensors to isolate the pressure of the sensors from the pressure of the pump and robotic hand hydraulic joints.

In some embodiments, a flow meter is located at a pump outlet to measure flow out of a hydraulic pump. A flow meter is at a reservoir of a hydraulic power unit to measure flow going into the reservoir. If the flow leaving the pump is not substantially equal to the flow entering the reservoir, the pump and flow to the hydraulic circuit is turned off, as such conditions indicate that a leak has occurred.

In some embodiments, disclosed is a hydraulic circuit for a robotic hand. The robotic hand includes robotic fingers including joint pairs that are controlled by a single hydraulic directional valve. In some embodiments, the joint pair includes a flow regulator to ensure that flow to all the joint pairs is equal.

In some embodiments, disclosed is a robotic hand hydraulic circuit. Linear hydraulic cylinders make contact with an object and a rotating joint applies rotational force to the object. The linear hydraulic cylinders control an applied force to the object by the robotic hand by controlling a pressure in the linear cylinders independently of a pressure in the finger joints. In some such embodiments, the linear hydraulic cylinders have a different pressure than a pressure of the rotating joints.

In some embodiments, disclosed is a robotic hand configured to individually control a hydraulic joint of two fingers, and control remaining fingers with open and close hydraulic control only.

In some embodiments, disclosed is a robotic arm with hydraulic actuation. Hydraulic control valves (e.g., all of the hydraulic control valves) for the motion of each hydraulic joint are located on the robotic arm at each individual joint.

Figure 23:
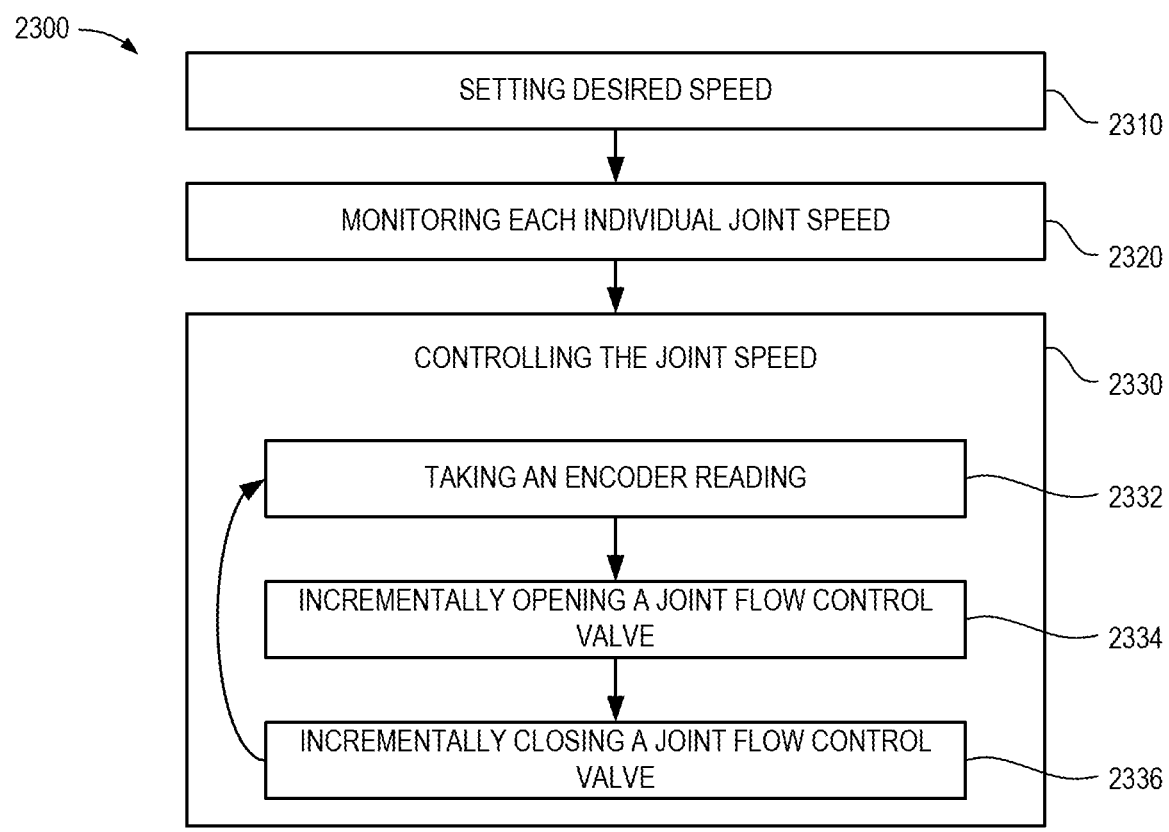
FIG. 23 is a simplified flowchart illustrating a method of controlling speed of a robotic arm, hand, or finger, according to some embodiments.

FIG. 23 is a simplified flowchart illustrating a method 2300 of controlling speed of a robotic arm, hand, or finger, according to some embodiments. One issue confronted by designers of robotics is momentum and speed with varying loads. A simple method to control both the momentum and speed of a hydraulic robotic arm is with a speed control method 2300. This method 2300 is specific to hydraulic control. To execute the speed control algorithm, the hydraulic circuit 2200 (FIG. 22) uses an encoder at each robotic joint 2210. A processor (e.g., a microprocessor) sets the desired speed of the robotic joints 2210, which may be a kinematic function of end effectors speed and position.

The method 2300 includes setting 2310 the desired speed, monitoring 2320 each individual joint speed, and controlling 2330 the joint speed. Controlling the joint speed includes taking 2332 an encoder reading, incrementally opening 2334 a joint flow control valve if the joint speed is too slow, and incrementally closing 2336 the joint flow control valve if the joint speed is too high. The taking 2332 an encoder reading and incrementally opening 2334 and closing 2336 the joint flow control valve depending on the joint speed is repeated during operation.

This method 2300 is used with both ramp down and ramp up speed control to slowly stop and start joint 2210 (FIG. 22) movements. The method 2300 automatically compensates for load, momentum, and kinematic end effectors' speed. The repeatability can be increased by correcting for the error in accuracy by adding or subtracting the undershoot or overshoot to the next operation. For example, if the programmed movement is 60 degrees, and the encoder reads a movement of 60.1 degrees, the return position would move back 60.1 degrees with an error of plus 0.1 added to the move back to 0 degree position. This effectively increases the repeatability of the movements and the accuracy of subsequent movements.

In some embodiments, disclosed is a velocity control algorithm that monitors the speed of hydraulic robotic joints from a preset speed. In some embodiments, the algorithm includes opening a flow control valve to increase the joint speed if the speed is too slow. In some embodiments, the algorithm includes closing the control valve to slow the joint speed if the speed is too fast. In some embodiments, the speed control algorithm is applied to each joint of a robotic arm and/or hand individually.

Figure 24:
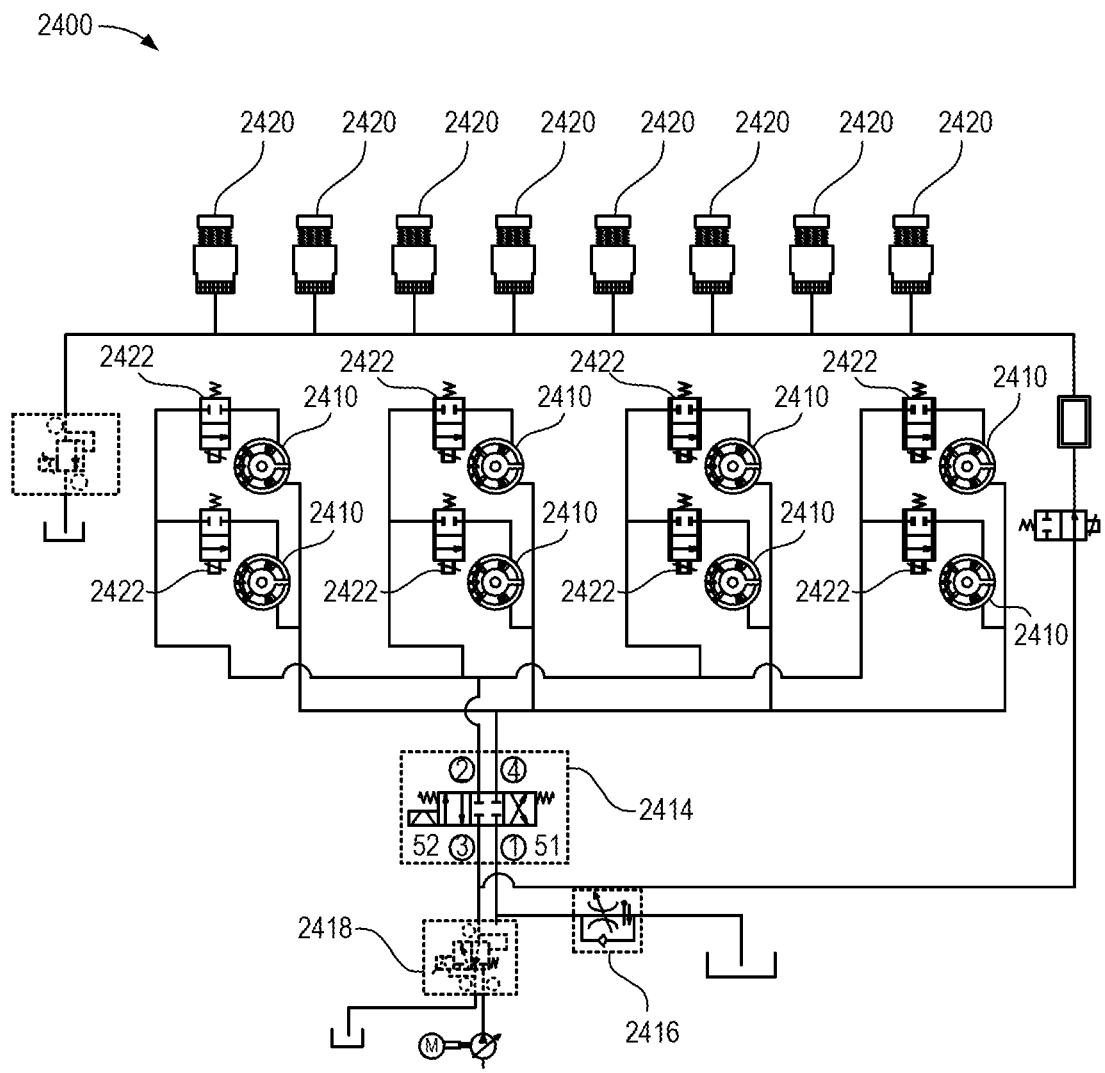
FIG. 24 is a simplified circuit diagram of a control circuit configured to control a robotic hand, according to some embodiments.

FIG. 24 is a simplified circuit diagram of a control circuit 2400 configured to control a robotic hand, according to some embodiments. The control circuit 2400 includes joints 2410 and links 2420 of a robotic hand, according to embodiments disclosed herein. The control circuit 2400 also includes two-way valves 2422 operably coupled to the joints 2410, as illustrated in FIG. 24. The control circuit 2400 also includes a hydraforce closed center valve 2414 operably coupled to the links 2410, the two-way valves 2422, a flow control needle valve 2416, and a pressure reducing valve 2418. The two-way valves 2422 can be pulse width modulated (PWM) to control the speed of each joint 2410 of the robotic hand. In this way, the robotic joints 2410 can be made to close at the same speed regardless of payload, gravity, or frictional variances internal to the joints 2410. The two-way valves also enable positional control of each individual joint 2410.

Figure 25:
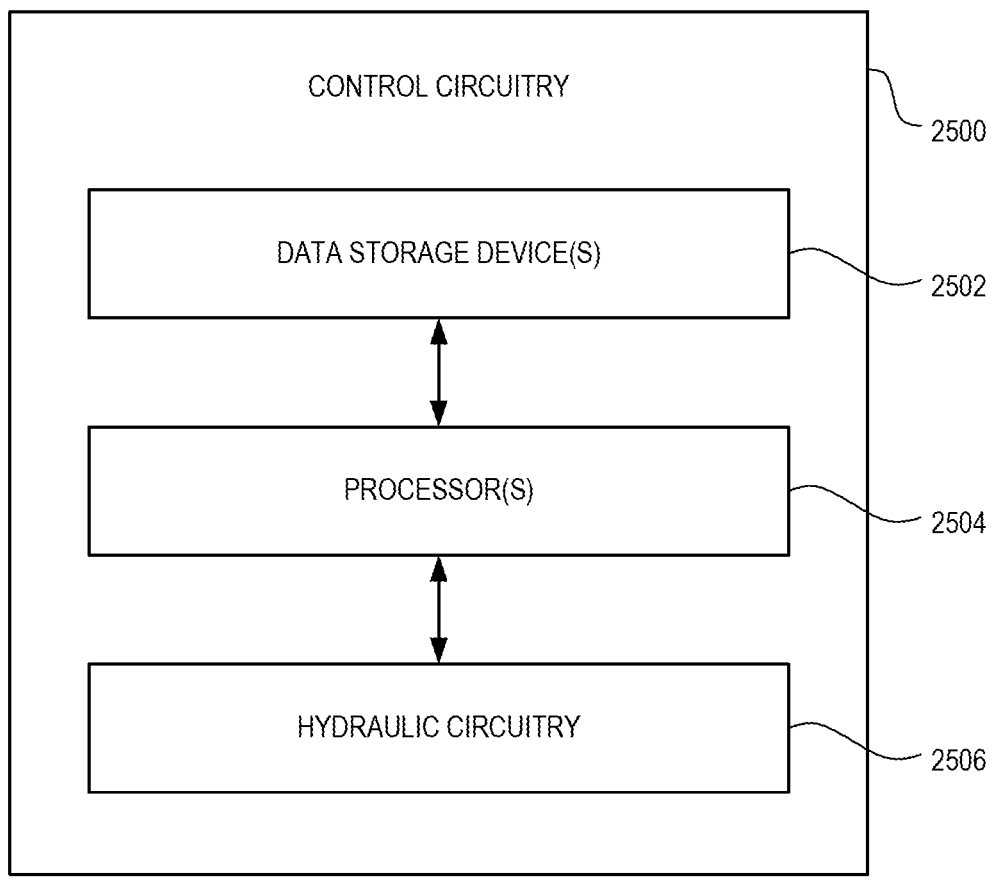
FIG. 25 is a simplified block diagram of control circuitry configured to perform embodiments disclosed herein.

FIG. 25 is a simplified block diagram of control circuitry 2500 configured to perform embodiments disclosed herein. For example, the control circuitry 2500 may be configured to implement the method 2300 of FIG. 23, and other methods disclosed herein. The control circuitry 2500 includes one or more processors 2504 operably coupled to one or more data storage devices 2502 and hydraulic circuitry 2506 (e.g., hydraulic circuitry disclosed with regards to FIGS. 17-20 and/or 24).

In some embodiments, the processors 2504 may include a microcontroller, a central processing unit (CPU), a programmable logic device (e.g., a field programmable gate array (FPGA), a programmable logic controller, etc.), or other device configured to execute computer-readable instructions.

The data storage devices 2502 include non-transitory data storage. By way of non-limiting example, the data storage devices 2502 may include one or more of random access memory (RAM), read only memory (ROM), Flash, electrically programmable read only memory (EPROM), optical discs and disc drives (e.g., compact disc, digital versatile disc, a hard drive, a solid state drive, other data storage devices, or combinations thereof. The data storage devices 2502 are configured to store computer-readable instructions configured to instruct the processors 2504 to perform embodiments disclosed herein.

Figure 26A:
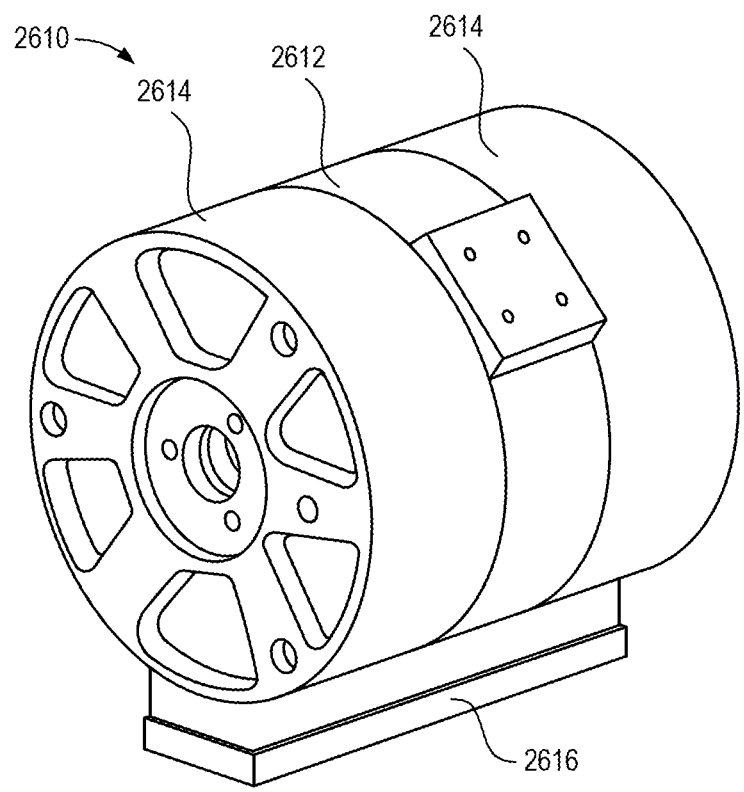
FIGS. 26A and 26B are a simplified perspective view and a simplified exploded view, respectively, of a robotic joint, according to some embodiments.
Figure 26B:
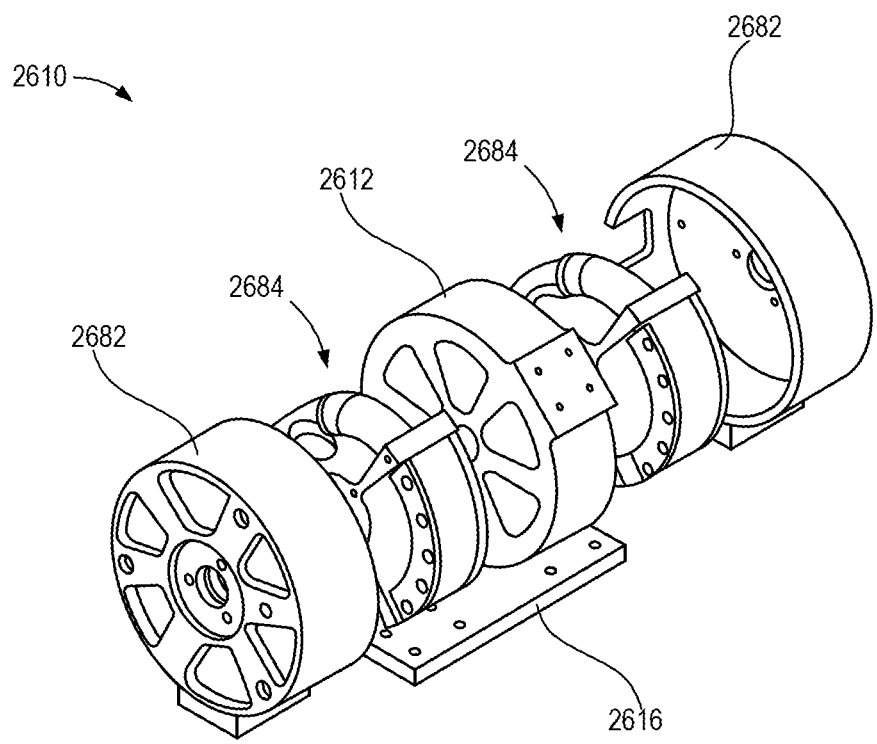

FIGS. 26A and 26B are a simplified perspective view and a simplified exploded view, respectively, of a robotic joint 2610, according to some embodiments. The robotic joint 2610 includes a center section 2612 and two outer sections 2614. The center section 2612 is configured to rotate, and the two outer sections 2612 are configured to remain stationary. Outer housing halves of the two outer sections 2614 are attached together (e.g., by a connecting member 2616) so that the inner center section 2612 rotates in relation to the outer housing halves.

Each of the outer sections 2614 includes an actuator 2684 (e.g., hydraulic actuators), which may be similar to any of the actuators previously discussed herein. In contrast to embodiments disclosed above (in which actuators are shown connected in series to increase degree of rotation), however, the actuators 2684 are connected in parallel to increase a total torque in rotating the center section 2612 (e.g., analogous to series and parallel connected electrical circuits).

The center section 2612 is a parallel hydraulic connection that adds the torque from each actuator 2684 together. Thus connected, higher power is delivered to the center section 2612 than if only a single actuator 2684 were driving the center section 2612. Both actuators 2684 may rotate together, and the torque of each actuator 2684 is cumulative to the center section 2612. The rotation of the joint 2610, however, is not cumulative. Rather, the torque generated by each actuator 2684 is cumulative.

One difference between parallel connected actuators and series connected actuators is that the actuators are bidirectional and move incrementally in proportion to the amount of fluid added to the actuator cylinders. The parallel configuration may have the actuators located in the center with rotating section located in the housing as an alternative design.

In some embodiments, disclosed is an arc-shaped piston guide exterior to torus shaped cylinders, the arc-shaped piston guide configured to support, guide, and provide a low wear surface for a piston. The piston guide may be on one or both sides of the piston external to the torus cylinder.

In some embodiments, an axle supports dual actuator assemblies. The axle is fixed and stationary with respect to a first actuator and housing on one end of the axle. A second actuator and housing is free to rotate on the axle on a second end of the axle.

In some embodiments, an axle aligns and supports two actuators in which the two actuators remained in fixed stationary alignment. A rotating member is located between the two stationary actuators, in which the rotating member rotates on the axle. The rotating member is driven by the rotation of torus pistons of the actuators. Drive pins are connected to the rotating member from each stationary actuator piston to cause rotation.

In some embodiments, disclosed is a plastic rotating joint including a piston rod, a rotatory actuator, and a torus cylinder. The piston rod extends through an extension chamber of a rotatory actuator into a retraction chamber of the same rotary actuator. The piston rod connects to a piston, which traverses through the torus cylinder, on both the retraction chamber side of the piston and the extension chamber side of the piston. The piston rod has a torus shape that centers inside the torus cylinder, and connects to both sides of a piston face in the retraction and extension chambers of the torus cylinder. The ends of the piston rod are connected together by a linkage mechanism.

In some embodiments, the cylinders, which may be aluminum, may be anodized. The anodized surface may be Teflon impregnated to decrease friction of piston seals and rod seals. Electrodes may be placed in both an end cap and piston for displacement measurements. The electrodes may only cover a portion of the piston and endcap in a crescent shape.

In some embodiments, an alignment tongue and groove on a torus cylinder and endcap maintain alignment of the endcap in relation to the torus cylinder during assembly. A radius of curvature of a through hole of the end cap matches a radius of the torus-shaped piston rod, which maintains alignment by the tongue and groove of the endcap and cylinder assembly.

In some embodiments, a plastic rotating torus actuator wherein an external molded housing permanently affixes an endcap to a cylinder. A static seal may be placed between the cylinder and endcap to prevent leaking.

In some embodiments, disclosed is a rotating fluid actuated joint. The joint is sealed from external leakage. A sealing mechanism affixes a stationary seal on one joint housing half and a second joint half rotates inside the stationary seal. A rubber lip seal allows rotation of a second joint housing inside a stationary seal of a first half joint housing. A fluid port on a robotic joint returns leaked fluid to a fluid reservoir.

In some embodiments, disclosed is a robotic finger with a robotic skin for containment of leaked fluids with fluid ports to return leaked fluid to a fluid reservoir.

In some embodiments, disclosed is a robotic joint including a plurality of joint halves. Each joint half is sealed to prevent leaking fluids from exiting the joint half. A drive pin of each actuator of each joint half is sealed to prevent leakage from the joint half. A fluid hose captures leaked fluid and returns the leaked fluid to a fluid reservoir.

In some embodiments, disclosed is a hydraulic circuit configured to enable manually teaching a robotic arm or finger. The hydraulic circuit equalizes a pressure between an extension chamber and a retraction chamber of the robotic arm or finger. A hydraulic pressure from a hydraulic pump may regulate the pressure such that a force of gravity and friction can be cancelled. The hydraulic pressure from the pump is set to equal the force of gravity. A force from manual manipulation by a human is measured such that a force of hydraulic actuation is used to assist the human through actively controlling the pressure to cancel all forces except the force from human manipulation. A force/torque sensor is used to measure the force from human manipulation. A flow regulator is set to limit maximum velocity of the manual manipulation by an operator. The velocity is determined from encoder readings. Regulating a flow control valve provides additional pressure control.

In some embodiments, disclosed is a robotic hand. A hydraulic force applied to an object by the robotic hand is controlled by controlling a pressure of actuators of the robotic hand. The pressure is controlled by a pressure reducing valve.

In some embodiments, disclosed is a rotating joint actuated by a fluid media. Actuators of the rotating joint are connected fluidically in series such that the degrees of rotation from one actuator are added to degrees of rotation of subsequent actuators.

In some embodiments, disclosed is a rotating joint actuated by a fluid media. Actuators of the rotating joint are connected fluidically in parallel such that the torque from one actuator is added to the torque of subsequent actuators.

In some embodiments, disclosed is a torus-shaped piston rod that extends from a retraction chamber of a torus cylinder into an extension chamber of the torus shaped cylinder.

It will be apparent to those having skill in the art that many changes may be made to the details of the above-described embodiments without departing from the underlying principles of the invention. The scope of the present invention should, therefore, be determined only by the following claims.

The invention claimed is:

1. A hydraulic joint comprising:
a first dual directional actuator and a second dual directional actuator, wherein the first and second dual directional actuators are coupled to one another within the hydraulic joint, the first and second dual directional actuators being configured to rotate to increase the rotational range of the hydraulic joint as compared to a hydraulic joint including only the first or second dual directional actuator;
wherein:
the first dual directional actuator includes a first actuation cylinder configured in an arc shape and both a first piston and a first piston rod disposed within the first actuation cylinder, the first piston and the first piston rod being configured to rotate in a first direction in response to fluid media entering a first fluid port of the first actuation cylinder and exiting from a second fluid port of the first actuation cylinder; and
the second dual directional actuator includes a second actuation cylinder configured in an arc shape and both a second piston and a second piston rod disposed within the second actuation cylinder, the second piston and the second piston rod being configured to rotate in response to the fluid media entering a second fluid port of the second actuation cylinder and exiting from a first fluid port of the second actuation cylinder; and
a linkage mechanism configured to couple the first piston rod and the second piston rod together.

2. The hydraulic joint of claim 1, wherein the first and second dual directional actuators are connected fluidically in series such that degrees of rotation of the first dual directional actuator are added to degrees of rotation of the second dual directional actuator.

3. The hydraulic joint of claim 1, further configured to couple to an additional dual directional actuator with a pressure hose and a drain hose of each dual directional actuator configured to be in fluid communication with one another.

4. The hydraulic joint of claim 1, further comprising a plurality of internal flow channels to allow the fluid media to flow into and out of the first and second actuation cylinders, the plurality of internal flow channels molded into the first and second dual directional actuators and coupled to each of the plurality of fluid ports.

5. The hydraulic joint of claim 4, further comprising a directional valve switch assembly to control the direction of fluid media flow through the plurality of internal flow channels and through the actuation cylinders.

* * * * *